United States Patent
Hiramatsu et al.

(10) Patent No.: US 6,708,020 B1
(45) Date of Patent: Mar. 16, 2004

(54) CALIBRATION DEVICE

(75) Inventors: Katsuhiko Hiramatsu, Yokosuka (JP); Atsushi Matsumoto, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,822

(22) PCT Filed: Jun. 16, 1999

(86) PCT No.: PCT/JP99/03196

§ 371 (c)(1),
(2), (4) Date: Mar. 20, 2000

(87) PCT Pub. No.: WO99/66685

PCT Pub. Date: Dec. 23, 1999

(30) Foreign Application Priority Data

Jun. 18, 1998 (JP) .......................................... 10-171014

(51) Int. Cl.[7] .................... H04B 15/00; H04B 1/04; H04B 17/00; G01S 7/40; H01Q 3/22
(52) U.S. Cl. .................. 455/65; 455/114.1; 455/226.1; 342/173; 342/368
(58) Field of Search ....................... 455/67.1, 65, 114.1, 455/68, 423, 226.1; 375/222; 342/173, 368

(56) References Cited

U.S. PATENT DOCUMENTS

| | | | |
|---|---|---|---|
| 4,119,964 A | * | 10/1978 | Fletcher et al. ............. 342/173 |
| 4,140,972 A | * | 2/1979 | Fletcher et al. ............... 455/68 |
| 5,710,977 A | | 1/1998 | Nakazawa |
| 5,907,797 A | | 5/1999 | Hanatatsu et al. |
| 5,995,539 A | * | 11/1999 | Miller ......................... 375/222 |
| 6,385,441 B1 | * | 5/2002 | Takakusaki ............... 455/226.1 |
| 6,430,399 B1 | * | 8/2002 | Niemela ....................... 455/65 |
| 6,449,466 B1 | * | 9/2002 | Jin et al. ..................... 455/114 |
| 6,480,153 B1 | * | 11/2002 | Jung et al. .................. 342/368 |
| 2002/0128007 A1 | * | 9/2002 | Miyatani .................... 455/423 |

FOREIGN PATENT DOCUMENTS

| | | |
|---|---|---|
| JP | 1149567 | 6/1989 |
| JP | 219034 | 1/1990 |
| JP | 4261248 | 9/1992 |
| JP | 537466 | 2/1993 |
| JP | 6201742 | 7/1994 |
| JP | 730461 | 1/1995 |
| JP | 879191 | 3/1996 |
| JP | 918528 | 1/1997 |
| JP | 9266464 | 10/1997 |

OTHER PUBLICATIONS

PCT International Search Report dated Sep. 28, 1999.
G. V. Tsoulos et al., "Calibration and Linearity issues for an Adaptive Antenna System," IEEE VTC, Phoenix, pp. 1597–1660, 1997–5.

* cited by examiner

*Primary Examiner*—William Cumming
(74) *Attorney, Agent, or Firm*—Stevens, Davis, Miller & Mosher, LLP

(57) ABSTRACT

A calibration device detects a delay or amplitude characteristic of a radio reception section. The characteristic is detected using a calibration signal of a band equal to or close to that used for radio communication.

21 Claims, 26 Drawing Sheets

CALIBRATION DEVICE

TECHNICAL FIELD

The present invention relates to a calibration apparatus applicable to a TDMA (Time Division Multiple Access) based and a CDMA (Code Division Multiple Access) based digital radio communication.

BACKGROUND ART

In conventional digital radio communications, a multiple access system is used and there are cases where an adaptive array antenna is used as the antenna. The multiple access system refers to a channel access system when a plurality of stations perform communications simultaneously using a same band. The TDMA system included in this multiple access system is called "time division multiple access system." This TDMA system implements multiple accesses by allowing a plurality of stations to use carriers of the same frequency, converting signals transmitted from those stations to intermittent signals (here, referred to as "burst signals") and aligning the burst signals of those stations in such a way that they do not collide with each other on the time scale.

However, the TDMA system has the difficulty in fully suppressing interference with other stations and this originates various problems such as increasing the number of interference signals as the number of multiplexing stations increases, making it difficult to acquire synchronization, deteriorating the communication quality and making communications impossible. If interference with other stations described above can be fully suppressed, it will be possible to improve the frequency utilization efficiency, improve the communication quality of each station in the same cell (area) and increase its capacity (multiplexing number or the number of channel accesses).

On the other hand, the adaptive array antenna is a system that determines a weight of each antenna output based on a control algorithm and controls directivity according to changes in the surrounding conditions. In the array antenna made up of a plurality of antennas, combining antenna outputs with an amplitude/phase shift added changes array directivity.

This adaptive array antenna is explained with reference to FIG. 18. FIG. 18 shows an overall configuration of a reception adaptive array antenna. In FIG. 18, antenna outputs 1802 from a plurality of antennas 1801 are multiplied by weights 1803 and combined into array output 1804. Here, weights are controlled by weight control section 1807 based on the following 3 pieces of information:

① Combined array output (1805)
② Each antenna output (1802)
③ Advance knowledge of desired signal (1806)

There are also cases where combined array output (1805) is not used for weight control.

Conventionally, the adaptive array antenna has been researched and developed as an antenna system to maximize SINR (Signal to Interference plus Noise Ratio) of a reception signal. The adaptive array antenna is also used as a countermeasure against interference among different stations in TDMA transmission. This adaptive array antenna in TDMA transmission is explained with reference to FIG. 19.

FIG. 19 shows an overall configuration of a TDMA reception adaptive array. In FIG. 19, reception outputs 1903 from radio sections 1902 connected to a plurality of antennas 1901 are multiplied by weights 1904 and combined into array output 1905. Weight control is performed in the same way as the control in FIG. 18 above. Reception data 1906 is obtained from array output 1905.

FIG. 20 is a conceptual diagram of TDMA transmission using an adaptive array antenna on the receiving side. Suppose BS 2001 is provided with a reception adaptive array antenna and is communicating with first MS 2002 equipped with a non-array antenna. At this time, BS 2001 eliminates delayed signals (2003 and 2004) by controlling directivity and suppresses interference signal from another station, second MS 2005, using the same frequency.

However, in FIG. 19, the amount of variation (D1, D2, . . . , Dn) made up of phase variation and amplitude variation generally varies among different radio sections 1902 due to variations in the delay characteristics and amplitude characteristics of elements such as amplifier and filter. Therefore, different phase variations and amplitude variations are added in different radio sections 1902 and the phase and amplitude of the reception signal at the antenna reception end and the phase and amplitude of the input signal to weight control section vary from one antenna to another. Because of this, the directivity pattern including a null point obtained from a weight convergence result is different from the actual directivity pattern.

Furthermore, when transmission directivity is controlled using the reception weights above, correct directivity control is not possible. To prevent the phenomena above, it is indispensable to retain the phase difference and amplitude ratio of the reception signal at each antenna reception end in the stage of signal input to weight control section 1907, too. To do this, it is necessary to detect the delay (D1, D2, . . . , Dn) and amplitude of each radio section beforehand and compensate the variations (differences) of the amount of delay and amount of amplitude using some method.

One possible compensation method is the method of multiplying reception outputs 1903 from the radio sections in FIG. 19 by phase offsets corresponding to the delay difference and gain offsets corresponding to the amplitude ratio. Regarding detection of variations in the phase and amplitude characteristics of an adaptive array apparatus, there is a report in the thesis G. V. Tsoulos, M. A. Beach "Calibration and Linearity issues for an Adaptive Antenna System" (IEEE VTC, Phoenix, pp.1597–1660, May 1997). The thesis above proposes a system using a tone signal as the calibration signal.

A calibration apparatus of radio sections in conventional TDMA transmission using this tone signal is explained with reference to FIG. 21. FIG. 21 is a block diagram showing an overall configuration of the calibration apparatus in the conventional radio section. FIG. 21 illustrates a case where the number of antennas is 2.

Tone signal (sine wave signal) 2102 generated from calibration signal generator 2101 is input to radio transmission section 2103. In this example, the reception sections perform quadrature modulation and $\sin(\omega t)$ and $\cos(\omega t)$ are input as orthogonal IQ signals. Suppose tone signal cycle T at this time is $2\pi/\omega$ and for information symbol frequency fs, $\omega = fs/m$ (m>1). FIG. 22 shows a constellation of the tone signal in the IQ plane. The signal rotates on the circumference in the figure with a constant cycle of $2\pi/\omega$.

Radio transmission section 2103 has a function of transmitting signals with reception carrier frequency fc of the radio reception sections that carry out delay detection. The signal output with carrier frequency fc is sent via a cable, etc. from transmission terminal 2104 to antenna connection terminals 2107 and 2108 of radio reception sections 2105 and 2106, respectively. At this time, suppose these cables are equal in length with sufficient accuracy relative to the wavelength of the carrier frequency. Quadrature detection outputs 2109 and 2110 of their respective radio reception sections are input to detection circuit 2111. Detection circuit 2111 compares input tone signal 2102 and detection output 2109 and detects:

(Amplitude ratio, phase difference)=($Ar1$, $\Delta\phi r1$) (2112)

Detection circuit 2111 also compares tone signal 2102 and detection output 2110 and detects:

(Amplitude ratio, phase difference)=($Ar2$, $\Delta\phi r2$) (2113)

FIG. 23 is a constellation example of tone signal a(t) and detection output b(t) at time t. At this time, the relationship between b(t) and a(t) is expressed using phase difference ω and amplitude ratio A as follows:

$$b(t)=A \cdot \exp(j\phi) \cdot a(t)$$

Here, phase difference φ represents a delay (amount of phase) of the remainder (Dmodλ: mod is remainder operator) obtained by dividing total delay D of delay Dt of the radio transmission section, cable delay Dk and delay Dr of the radio reception section (D=Dt+Dk+Dr) by tone signal wavelength λ=c/ω (c: velocity of light).

In FIG. 21, since delay Dt of radio transmission section 2103 and cable delay Dk are common to two radio reception sections 2105 and 2106, the difference between detected phase differences Δφr1 and Δφr2 is the difference in delay between radio reception sections 2105 and 2106. Moreover, amplitude ratio A represents the ratio of the amplitude of calibration signal 2102 to the amplitude of the detection output. Therefore, the ratio of detected amplitude ratio Ar1 to Ar2 represents the difference (amplitude ratio) in the amplitude characteristic between reception sections 2105 and 2106.

Detecting the amplitude ratio and phase difference of each radio section using the above apparatus beforehand can compensate variations (differences).

However, since the calibration signal of the calibration apparatus of the radio sections in the conventional TDMA transmission is a tone signal, only the delay characteristic and amplitude characteristic at a specific frequency, for example central frequency f0, are measured. However, a TDMA transmission modulated signal used for actual communications is a wideband signal and group delay characteristic and frequency characteristic of a filter, etc. in the reception section vary in delay and attenuation depending on the frequency.

Therefore, the calibration apparatus in the conventional TDMA transmission cannot measure the delay characteristic and amplitude characteristic at the reception sections accurately when a demodulated signal is received.

FIG. 24 is a drawing showing the spectrum status of a calibration signal and transmission signal. In FIG. 24, while the modulated signal is a wideband signal with bandwidth M [Hz] centered on central frequency f0, the calibration signal is a line spectrum. In this way, the calibration signal is by far different from the actual modulated signal.

DISCLOSURE OF INVENTION

It is an objective of the present invention to provide a calibration apparatus capable of accurately detecting the delay characteristic and amplitude characteristic of radio reception sections and radio transmission sections in transmission.

This objective is achieved by a calibration apparatus that detects delay characteristic and amplitude characteristic of radio reception sections using a calibration signal of the same band as or a band close to that of a modulated signal used in actual communications.

BEST MODE FOR CARRYING OUT THE INVENTION

With reference now to the attached drawings, the best modes for carrying out the present invention are explained in detail below. In the following explanations, suppose the amount of variation from hybrid H to the radio reception section (RX1) and the amount of variation (phase and amplitude) from hybrid H to radio reception section (RX2) are already measured and known. Moreover, a digital signal is propagated from the code generator to the transmitter and from the receiver onward.

EMBODIMENT 1

Figure 1:
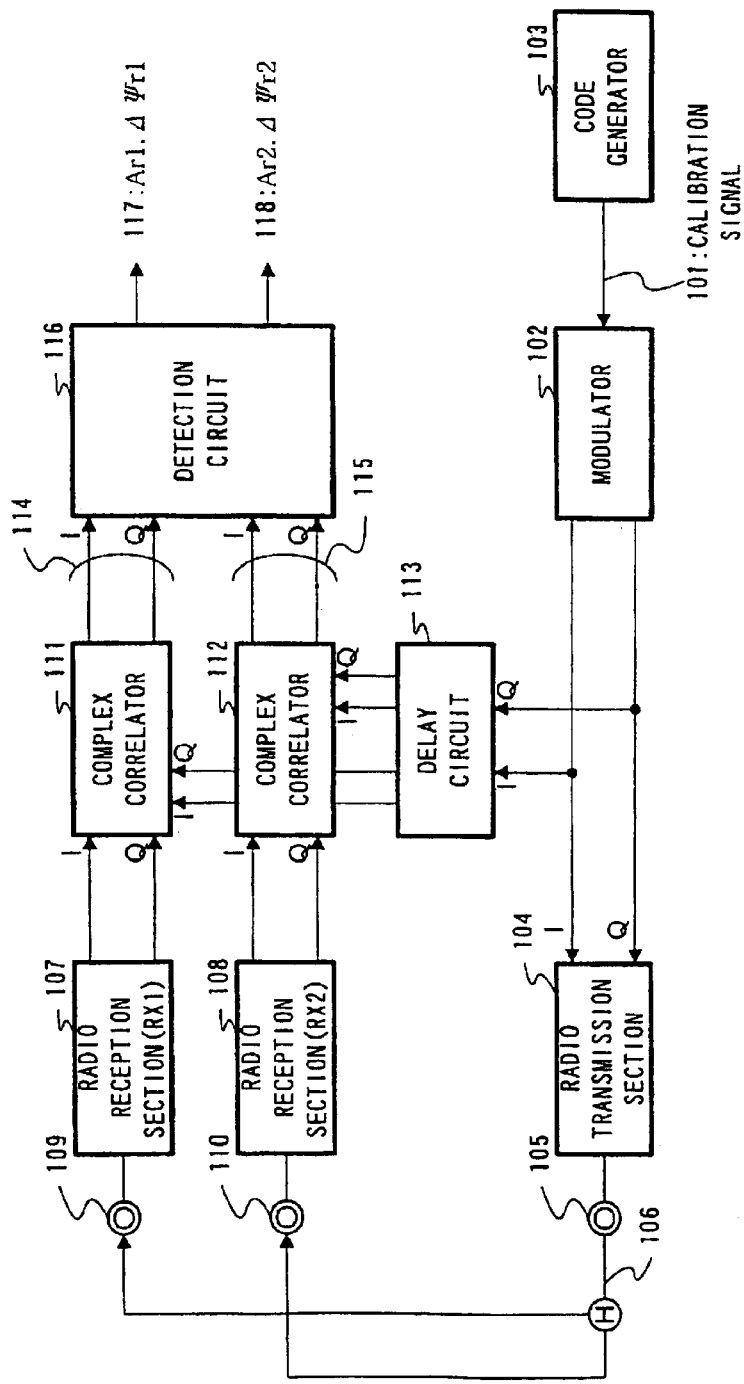
FIG. 1 is a block diagram showing an overall configuration of a calibration apparatus according to Embodiment 1 of the present invention.

FIG. 1 is a block diagram showing an overall configuration of a calibration apparatus according to Embodiment 1 of the present invention. The calibration apparatus according to Embodiment 1 is equipped with 2 antennas and the modulation system used is the same system as for normal communications, QPSK modulation, for example. Suppose the radio sections perform quadrature modulation and quadrature detection.

Calibration signal 101 is generated by code generator 103, modulated by modulator 102 and input to radio transmission section 104. Here, code generator 103 generates PN codes and orthogonal codes. The modulated calibration signal is input to radio transmission section 104.

In radio transmission section 104, the transmission signal is quadrature-modulated, then up-converted to carrier frequency fc and output from transmission terminal 105. fc is a reception carrier frequency of the present system (radio reception section).

The calibration signal output with carrier frequency fc is transmitted from transmission terminal 105 to antenna connection terminals 109 and 110 of radio reception sections 107 and 108 using cable 106, etc. At this time, suppose the cables are equal in length with sufficient accuracy relative to the wavelength of the carrier frequency. The calibration signal output from radio transmission section 104 becomes a signal with the same band as or a band close to that of the modulated signal used for communications.

The reception outputs of the radio reception sections are input to complex correlators 111 and 112. Complex correlators 111 and 112 perform correlation detection at a timing adjusted by delay circuit 113 and output correlation outputs 114 and 115, respectively.

Detection circuit 116 obtains (amplitude ratio, phase difference)=(Ar1, Δφr1) 117 by comparing reception signal point (hereinafter referred to as "reception point") r1 obtained from correlation output 114 and an identification point to be a reference (hereinafter referred to as "reference identification point"). The phase difference obtained here corresponds to the delay of the remainder obtained by dividing total delay D of delay Dt of radio transmission section 104, delay Dk of cable 106 and delay Dr1 of radio reception section 107 (D=Dt+Dk+Dr1) by wavelength λc of carrier frequency fc.

Likewise, detection circuit 116 obtains (amplitude ratio, phase difference)=(Ar2, Δφr2) 118 by comparing reception signal point r2 obtained from correlation output 115 and a reference identification point.

Figure 2:
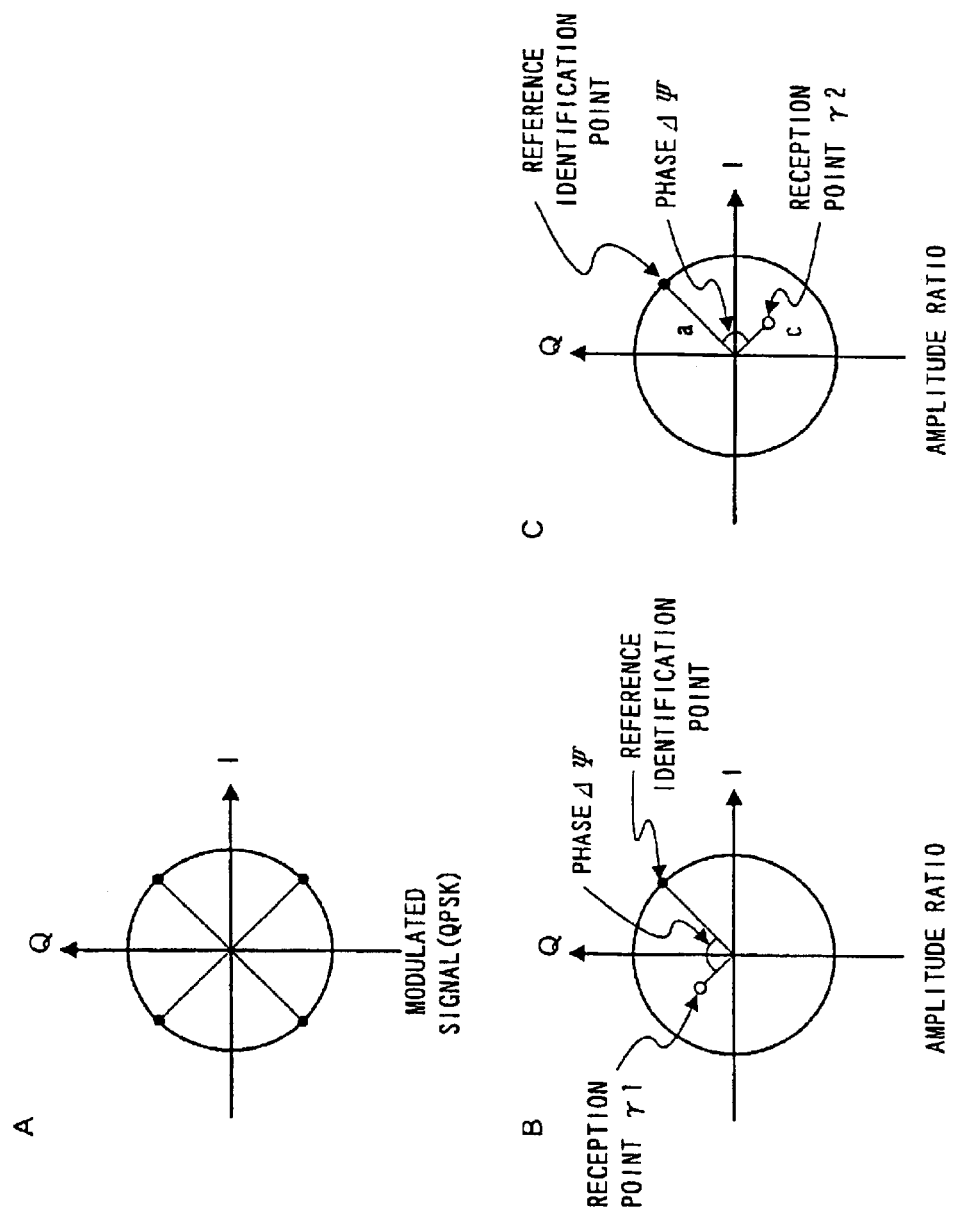
FIG. 2A is a drawing showing the positions of reference identification points with QPSK modulation in the calibration apparatus in the embodiment above.
FIG. 2B is a drawing showing a constellation and the amplitude ratio and phase difference from a reference identification point on the radio section RX1 side in the calibration apparatus in Embodiment 1 above.
FIG. 2C is a drawing showing a constellation and the amplitude ratio and phase difference from the reference identification point on the radio section RX2 side in the calibration apparatus in Embodiment 1 above.

FIG. 2 is a drawing showing a constellation of the modulated signal. FIG. 2A is a drawing showing the positions of reference identification points with QPSK modulation. Thus, with QPSK modulation, reference identification points are located on coordinates (1, 1), (−1, 1), (−1, −1) and (1, −1). FIG. 2B shows a constellation on the radio section RX1 (107) side, the amplitude ratio and phase difference from a reference identification point and FIG. 2C shows a constellation on the radio section RX2 (108) side, the amplitude ratio and phase difference from the reference identification point.

As shown above, when detecting the delay characteristic and amplitude characteristic of the reception sections in TDMA transmission, the present embodiment uses a signal with the same band as or a band close to that of the modulated signal used for actual communications as a calibration signal and compares the correlation output of the output signal from each radio reception section with a reference identification point making it possible to detect the delay difference and amplitude ratio more accurately.

Furthermore, by multiplying the output signal of each radio reception section by the detected phase difference and amplitude ratio as offsets, the present embodiment can also solve the problem that the directivity pattern including null points obtained from weight convergence results is different from the actual directivity pattern.

Embodiment 1 assumes that the modulation system used is QPSK modulation and the radio sections carry out quadrature modulation and quadrature detection, but it is obvious that the modulation system and detection system above are not indispensable in the present invention and similar detection is also possible using other systems. It is also apparent that the present invention can easily measure only either one of phase characteristic or amplitude characteristic.

Moreover, detected values need not necessarily be a delay difference and amplitude ratio from a reference identification point, but it is also possible to output offset values between different radio reception sections calculated based on the correlation outputs as detected values. For example, in FIG. 1, suppose correlation outputs 114 and 115 (reception points r1 and r2 in FIG. 2B and FIG. 2C) are expressed with positional vectors R1 and R2. Detection circuit 116 obtains offset values when carrying out compensation to make the phase characteristic and amplitude characteristic of the radio reception section match those of radio reception section RX1 (107). At this time, suppose the offset value is vector Zri (i=1, 2), then:

$$Zr1=51$$

$$Zr2=R1/R2=R1\times R2^*/|R2|2 \text{ (* denotes complex conjugate)}$$

Detection circuit 116 outputs the above values as 117 and 118. The calibration apparatus according to Embodiment 1 of the present invention can also output or store correlation values as they are. In this case, the array antenna radio reception apparatus carries out a calculation to obtain an offset value to compensate the delay difference and amplitude difference of each radio reception section using the stored correlation values. Then, the array antenna radio reception apparatus can compensate variations of the delay characteristic and amplitude characteristic by multiplying the output signals from radio reception sections RX1 (107) and RX2 (108) by Zr1 and Zr2 above and prevent the directivity pattern obtained from the weight convergence results from being different from the actual directivity pattern.

Moreover, all cables were supposed to be equal in length, but even if they are different, if the delay and attenuation are at least known beforehand, it is possible to detect the phase difference and amplitude ratio by compensating the known delay and attenuation above. Here, suppose all reference signals (clock generated by a crystal oscillator of 10 MHz, for example) used at the radio sections are common to those radio sections.

EMBODIMENT 2

Figure 3:
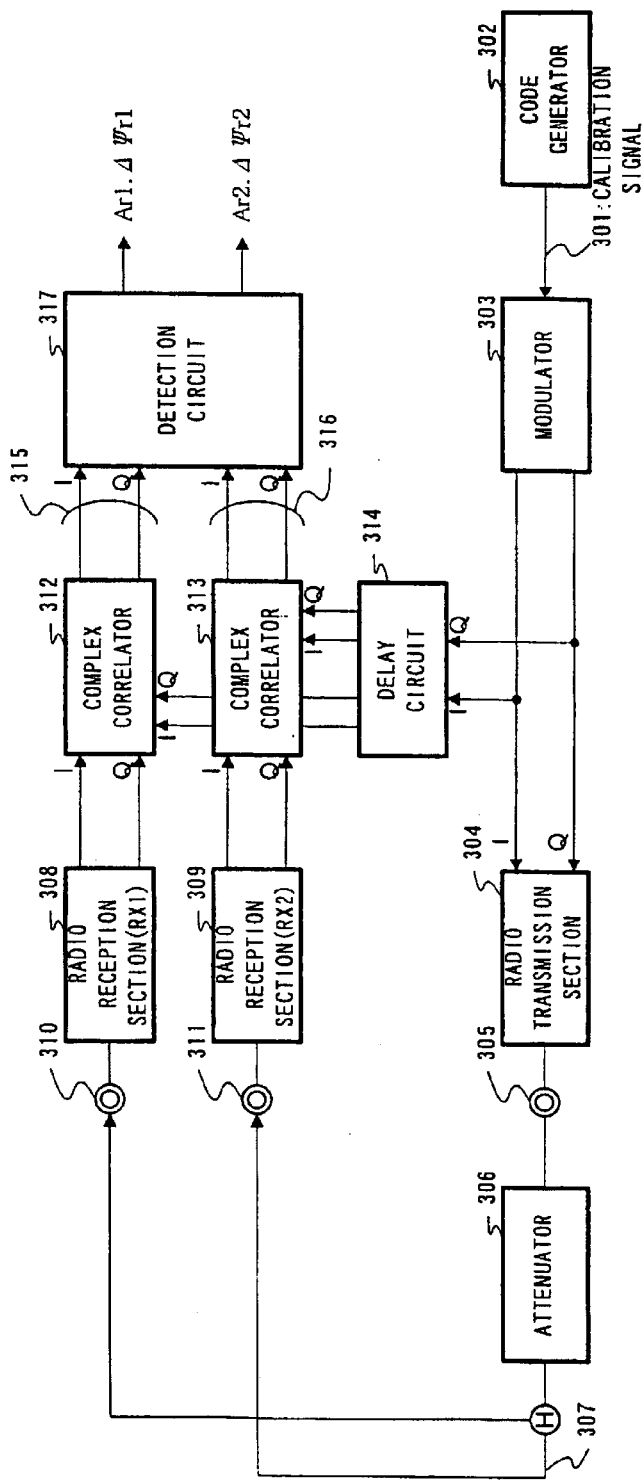
FIG. 3 is a block diagram showing an overall configuration of a calibration apparatus according to Embodiment 2 of the present invention.
Figure 25:
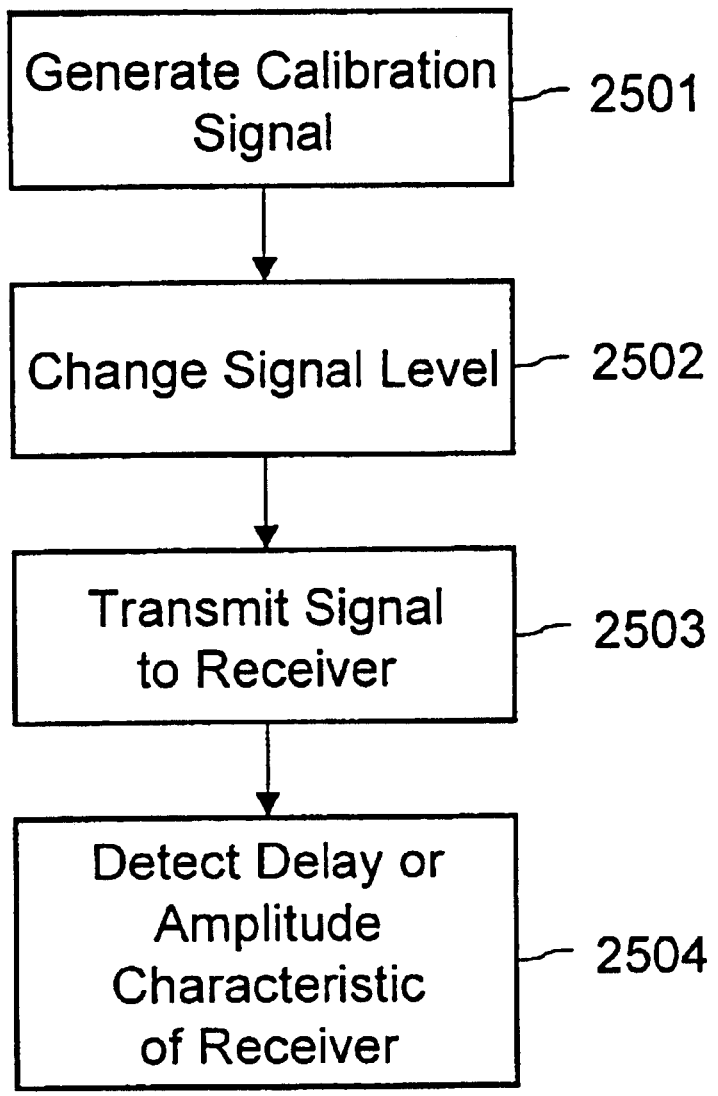
FIG. 25 illustrates an operation of the calibration apparatus illustrated by FIG. 3.

Then, the calibration apparatus according to Embodiment 2 of the present invention is explained. FIG. 3 is a block diagram showing an overall configuration of the calibration apparatus according to Embodiment 2 of the present invention and FIG. 25 illustrates an operation of this calibration apparatus. In Embodiment 2, attenuator 306 is provided at the output of transmission terminal 305. The calibration apparatus according to Embodiment 2 is also equipped with 2 antennas as in the case of Embodiment 1.

Figure 4:
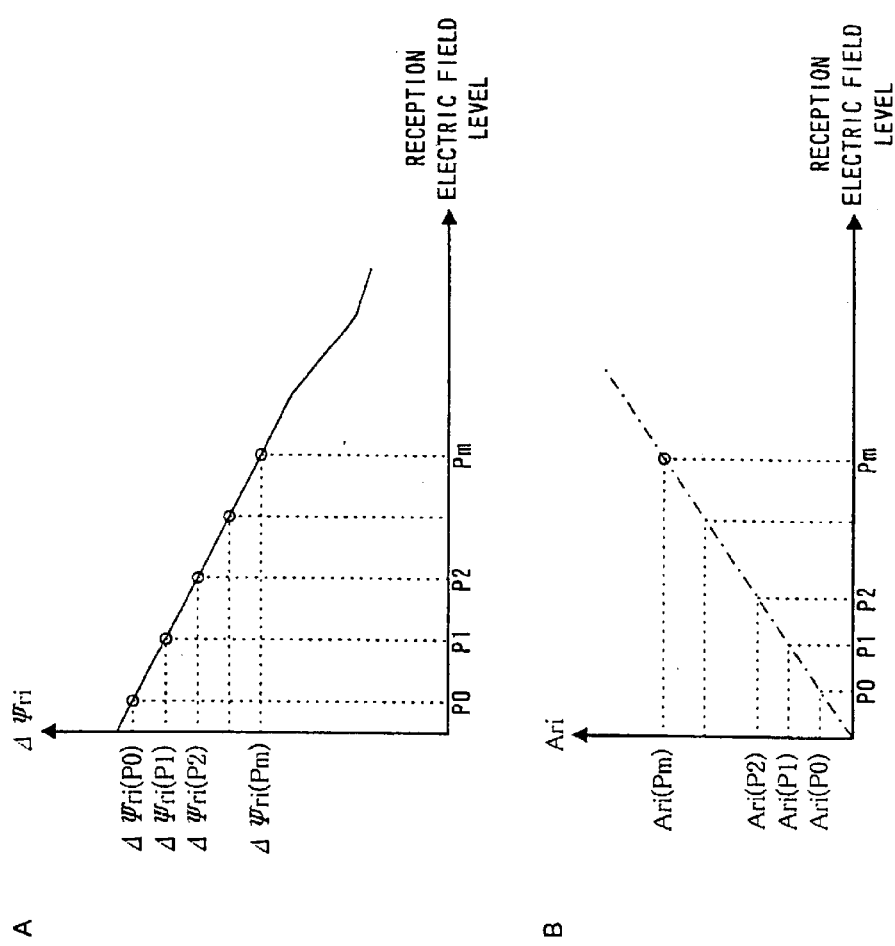
FIG. 4A is a drawing showing an example of delay characteristic Δφri(Pm) according to reception electric field level Pm of a reception section in the calibration apparatus according to Embodiment 2 above.
FIG. 4B is a drawing showing an example of amplitude characteristic Ari(Pm) according to reception electric field level Pm of a reception section in the calibration apparatus according to Embodiment 2 above.

FIG. 4A is a drawing showing an example of delay characteristic $\Delta\phi ri(Pm)$ according to reception electric field level Pm of a radio reception section in the calibration apparatus according to Embodiment 2 of the present invention and FIG. 4B is a drawing showing an example of amplitude characteristic Ari(Pm) according to reception electric field level Pm of the radio reception section in the calibration apparatus according to Embodiment 2 of the present invention. In the case of the delay characteristic and amplitude characteristic as shown in FIG. 4, detecting a delay when a signal is input to the radio reception section with a specific reception electric field level as shown in Embodiment 1 is not sufficient and it is necessary to measure delay characteristic $\Delta\phi ri(Pm)$ and amplitude characteristic Ari(Pm) when Pm is changed.

In FIG. 3, calibration signal 301 is generated (S2501) by code generator 302, modulated by modulator 303 and input to radio transmission section 304. This code generator 302 generates PN codes and orthogonal codes.

Then, in radio transmission section 304, the transmission signal is quadrature-modulated, then up-converted to carrier frequency fc and output from transmission terminal 305. fc is a reception carrier frequency of the present system. The signal output with carrier frequency fc is transmitted (S2503) from transmission terminal 305 to antenna connection terminals 310 and 311 of radio reception sections 308 and 309, respectively using cable 307 with attenuator 306 connected to change (S2502) the signal level of the signal output with carrier frequency fc.

The reception outputs of the radio reception sections are input to complex correlators 312 and 313. Complex correlators 312 and 313 output correlation outputs 315 and 316, respectively at a timing adjusted by delay circuit 314.

Detection circuit 317 obtains (S2504), outputs or stores phase differences $\Delta\phi r1(Pm)$ and $\Delta\phi r2(Pm)$, and amplitude ratios Ar1(Pm) and Ar2(Pm) when reception electric field level Pm is changed by changing the attenuator set values.

As shown above, the calibration apparatus according to Embodiment 2 of the present invention can obtain phase differences $\Delta\phi dr1(Pm)$ and $\Delta\phi r2$ (Pm), which correspond to the delay differences of the radio reception sections, and amplitude ratios Ar1(Pm) and Ar2(Pm) finely according to the reception electric field level, thus making it possible to accurately compensate variations of the delay characteristic and amplitude characteristic in the adaptive array antenna radio reception apparatus according to the reception power level.

EMBODIMENT 3

Figure 5:
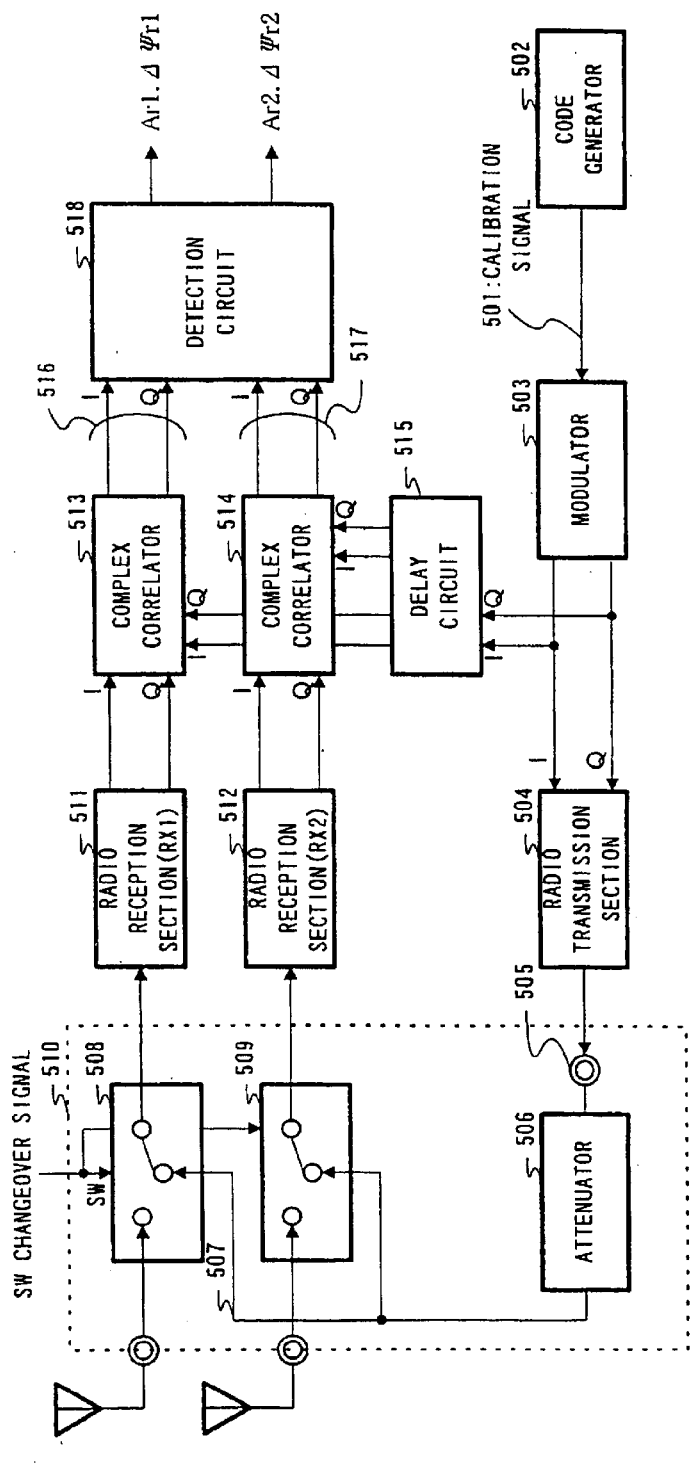
FIG. 5 is a block diagram showing an overall configuration of a calibration apparatus according to Embodiment 3 of the present invention.

Then, the calibration apparatus according to Embodiment 3 of the present invention is explained. FIG. 5 is a block diagram showing an overall configuration of the calibration apparatus according to Embodiment 3 of the present invention. The calibration apparatus according to Embodiment 3 has the configuration of Embodiment 2 above with changeover switches 508 and 509. Moreover, the calibration apparatus according to Embodiment 3 is equipped with 2 antennas as in the case of Embodiment 2.

In FIG. 5, the processing until calibration signal 501 is output from transmission terminal 505 and the reception electric field level of the output calibration signal is changed by attenuator 506 is the same as that of Embodiment 2 above. That is, calibration signal 501 is generated by code generator 502, modulated by modulator 503 and input to radio transmission section 504. Code generator 502 generates PN codes and orthogonal codes.

Then, in radio transmission section 504, the transmission signal is quadrature-modulated, then up-converted to carrier frequency fc and output from transmission terminal 505. The signal output with carrier frequency fc is transmitted from transmission terminal 505 to changeover switches 508 and 509 using cable 507 with attenuator 506 connected.

Changeover switches 508 and 509 switch between reception signals from the antennas and modulated signals for calibration according to SW changeover signal 510. The signals from changeover switches 508 and 509 are transmitted to radio reception sections 511 and 512, respectively.

The reception outputs from the radio reception sections are input to complex correlators 513 and 514. Complex correlators 513 and 514 perform correlation detection at a timing adjusted by delay circuit 515 and output correlation outputs 516 and 517, respectively. Detection circuit 518 obtains, outputs or stores phase differences $\Delta\phi r1(Pm)$ and $\Delta\phi r2$ (Pm), and amplitude ratios Ar1(Pm) and Ar2(Pm) when reception electric field level Pm is changed by changing the attenuator set values.

As shown above, the calibration apparatus according to Embodiment 3 of the present invention can measure the delay characteristic and amplitude characteristic of the radio reception sections on an as-needed basis by controlling switch changeover signals. This allows accurate compensation even if the delay characteristic and amplitude characteristic change with time according to the operating environment, etc.

EMBODIMENT 4

Figure 6:
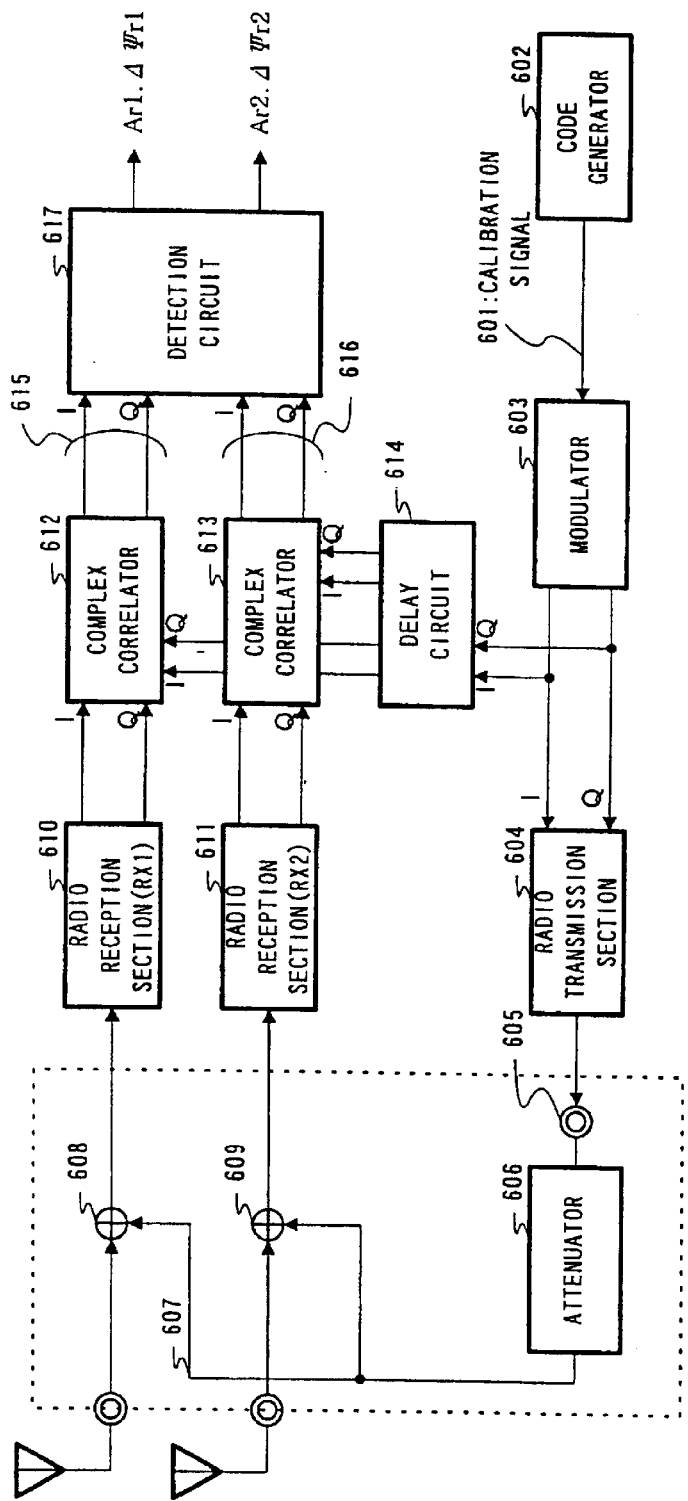
FIG. 6 is a block diagram showing an overall configuration of a calibration apparatus according to Embodiment 4 of the present invention.

FIG. 6 is a block diagram showing an overall configuration of the calibration apparatus according to Embodiment 4 of the present invention. As shown in FIG. 6, the calibration apparatus according to Embodiment 4 has the configuration of the calibration apparatus of Embodiment 2 above with multiplexing circuits. Moreover, the calibration apparatus according to Embodiment 4 is equipped with 2 antennas as in the case of Embodiment 2.

In FIG. 6, the processing until calibration signal 601 is output from transmission terminal 605 and the reception electric field level of the output calibration signal is changed by attenuator 606 is the same as that of Embodiment 2 above. That is, calibration signal 601 is generated by code generator 602, modulated by modulator 603 and input to radio transmission section 604. Code generator 602 generates PN codes and orthogonal codes.

In radio transmission section 604, the transmission signal is quadrature-modulated, then up-converted to carrier frequency fc and output from transmission terminal 605. The signal output with carrier frequency fc is transmitted from transmission terminal 605 to multiplexing circuits 608 and 609 using cable 607 with attenuator 606 connected.

Multiplexing circuits 608 and 609 multiplex reception signals from the antennas with modulated signals for calibration. Then, the multiplexed signals are sent to radio reception sections 610 and 611.

The reception outputs from the radio reception sections are input to complex correlators 612 and 613. Complex correlators 612 and 613 perform correlation detection at timings adjusted by delay circuit 614 and output correlation outputs 615 and 616, respectively.

Detection circuit 617 obtains, outputs or stores phase differences $\Delta\phi r1(Pm)$ and $\Delta\phi r2$ (Pm), and amplitude ratios Ar1(Pm) and Ar2(Pm) when reception electric field level Pm is changed by changing the attenuator set values.

As shown above, the calibration apparatus according to Embodiment 4 of the present invention can measure the delay characteristic and amplitude characteristic of the radio reception sections on an as-needed basis without interrupting normal communications. This allows accurate compensation even if the delay characteristic and amplitude characteristic change with time according to the operating environment, etc. If no measurement is performed, turning off the power to the radio transmission section can prevent any calibration signal, which can become a noise component to the reception signals, from being output.

EMBODIMENT 5

Figure 7:
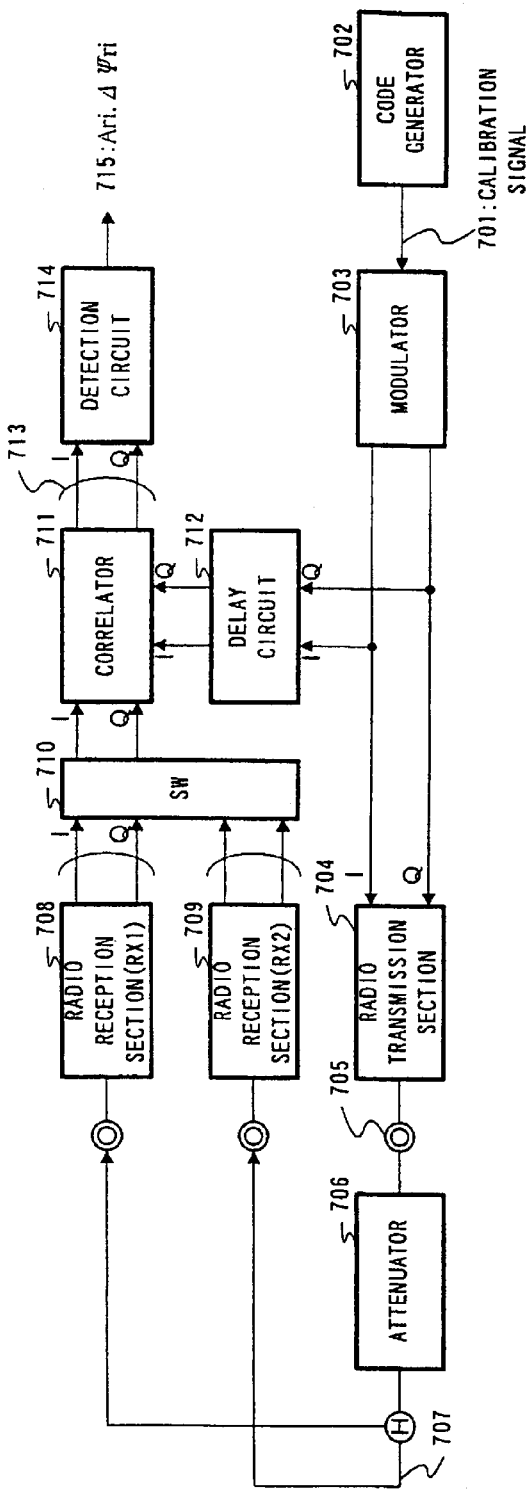
FIG. 7 is a block diagram showing an overall configuration of a calibration apparatus according to Embodiment 5 of the present invention.

Then, the calibration apparatus according to Embodiment 5 of the present invention is explained. FIG. 7 is a block diagram showing an overall configuration of the calibration apparatus according to Embodiment 5 of the present invention. The calibration apparatus according to Embodiment 5 is equipped with 2 antennas as in the case of Embodiment 2.

In FIG. 7, the operations until calibration signal 701 is output from transmission terminal 705 and the level of the reception electric field of the output calibration signal is changed by attenuator 706 are the same as those of Embodiment 2. That is, calibration signal 701 is generated by code generator 702, modulated by modulator 703 and input to radio transmission section 704. Code generator 702 generates PN codes and orthogonal codes.

In radio transmission section 704, the transmission signal is quadrature-modulated, then up-converted to carrier frequency fc and output from transmission terminal 705. The signal output with carrier frequency fc is transmitted from transmission terminal 705 to radio reception sections 708 and 709 using cable 707 with attenuator 706 connected.

The reception outputs from the radio reception sections are switched by changeover switch 710 and input to correlator 711. Correlator 711 performs correlation detection at a timing adjusted by delay circuit 712 and outputs correlation output 713.

Detection circuit 714 obtains, outputs or stores amplitude ratio Ari(Pm) and phase difference $\Delta\phi ri(Pm)$ 715 when reception electric field level Pm is changed by changing the set value of attenuator 706.

Thus, when changeover switch 710 selects the output of radio reception section 708, correlator 711 performs correlation detection and outputs correlation output 713.

Detection circuit 714 obtains, outputs or stores amplitude ratio Ar1(Pm) and phase difference $\Delta\phi r1(Pm)$ 715.

On the other hand, when changeover switch 710 selects the output of radio reception section 709, correlator 711 performs correlation detection and outputs correlation output 713. Detection circuit 714 obtains, outputs or stores amplitude ratio Ar2(Pm) and phase difference $\Delta\phi r2(Pm)$ 715.

As shown above, according to the calibration apparatus according to Embodiment 5 of the present invention, if the delay characteristic and amplitude characteristic of a plurality of radio reception sections are switched and obtained by means of time division, it is not necessary to process correlation operation and phase detection on input signals to a plurality of radio reception sections simultaneously, thus reducing the circuit scale of the calibration apparatus.

EMBODIMENT 6

Figure 8:
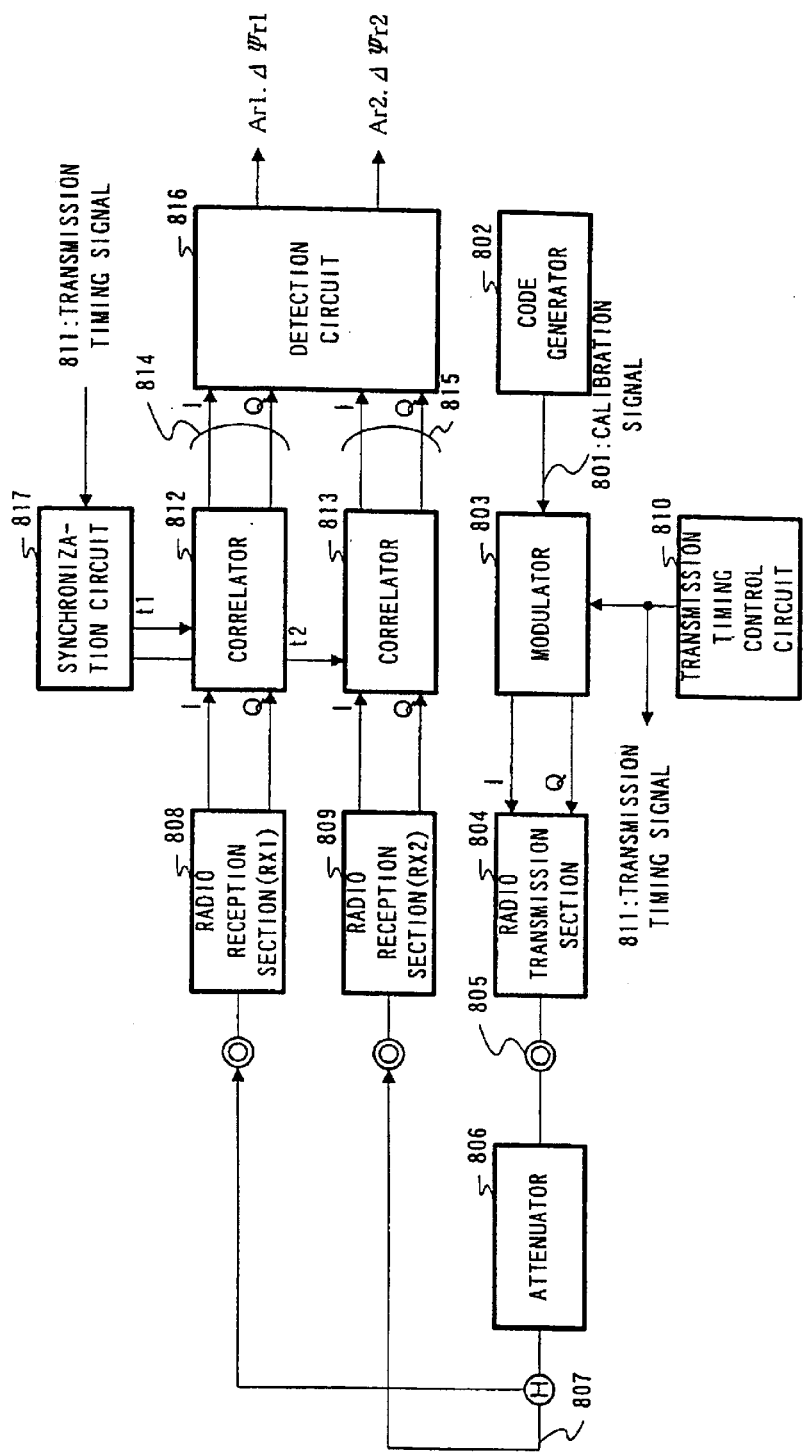
FIG. 8 is a block diagram showing an overall configuration of a calibration apparatus according to Embodiment 6 of the present invention.

The calibration apparatus according to Embodiment 6 of the present invention is explained. FIG. 8 is a block diagram showing an overall configuration of the calibration apparatus according to Embodiment 6 of the present invention. The calibration apparatus according to Embodiment 6 is equipped with 2 antennas as in the case of Embodiment 2.

In FIG. 8, the operations until calibration signal 801 is output from the transmission terminal and the level of the reception electric field of the output calibration signal is changed by attenuator 806 are the same as those of Embodiment 2 above. That is, calibration signal 801 is generated by code generator 802, modulated by modulator 803 and input to radio transmission section 804. Code generator 802 generates PN codes and orthogonal codes.

In radio transmission section 804, the transmission signal is quadrature-modulated, then up-converted to carrier frequency fc and output from transmission terminal 805. The signal output with carrier frequency fc is transmitted to radio reception sections 808 and 809 using cable 807 with attenuator 806 connected. At this time, transmission timing control circuit 810 outputs transmission timing signal 811 to modulator 803 and controls the transmission timing of the modulated calibration signal.

While in Embodiments 1 to 5 above control correlation detection timings by adjusting the correlator input timings of the modulated signal on the transmitting side, in Embodiments 6, synchronization circuit 817 generates correlation detection timing t1 and correlation detection timing t2 using transmission timing signal 811 as a cunning signal. That is, correlation detection timings are generated without the modulated signal on the transmitting side being input to the delay circuit. Then, correlators 812 and 813 perform correlation detection according to timing t1 and timing t2 above, respectively and output correlation outputs 814 and 815, respectively.

Detection circuit 816 obtains, outputs or stores phase differences $\Delta\phi r1(Pm)$ and $\Delta\phi r2$ (Pm), and amplitude ratios Ar1(Pm) and Ar2(Pm) when reception electric field level Pm is changed by changing the attenuator set values.

As shown above, the calibration apparatus according to Embodiment 6 of the present invention generates correlation detection timings by inputting the transmission timing of the modulated calibration signal as a cunning signal to the correlators, eliminating the need for adjusting the correlation timing of the modulated signal on the transmitting side. This reduces the circuit scale of the calibration apparatus.

EMBODIMENT 7

Figure 9:
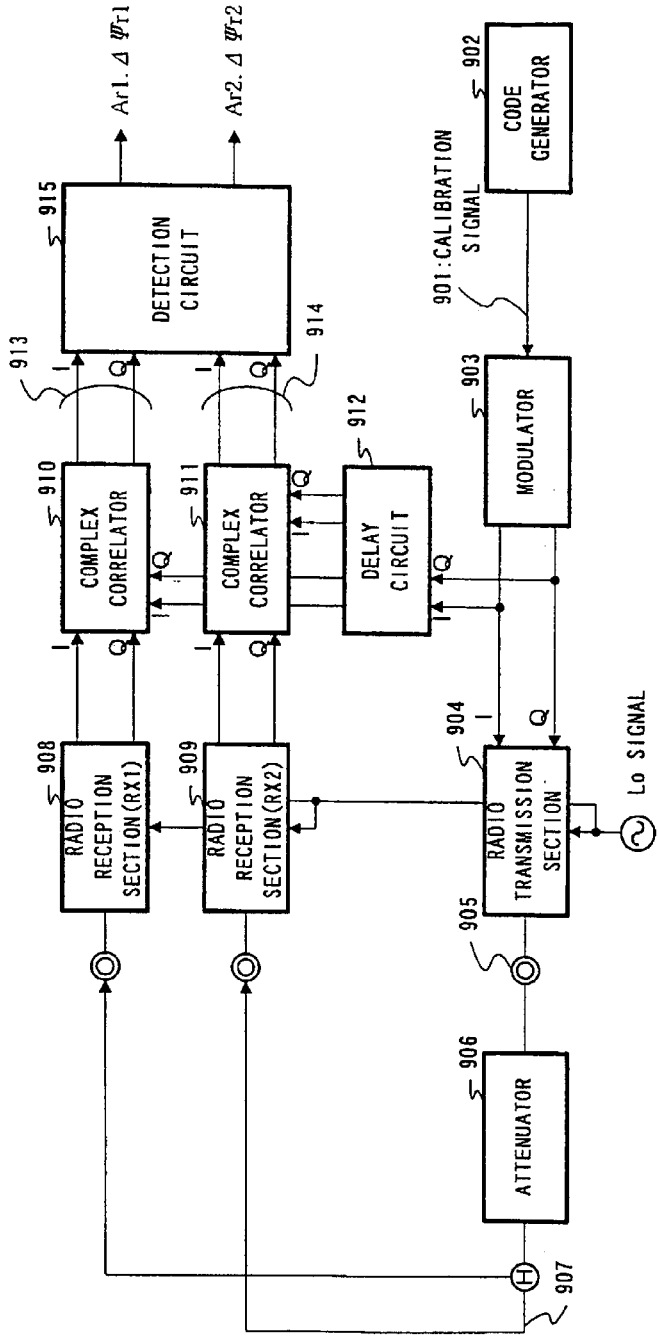
FIG. 9 is a block diagram showing an overall configuration of a calibration apparatus according to Embodiment 7 of the present invention.

Then, the calibration apparatus according to Embodiment 7 of the present invention is explained. FIG. 9 is a block diagram showing an overall configuration of the calibration apparatus according to Embodiment 7 of the present invention. The calibration apparatus according to Embodiment 7 is equipped with 2 antennas as in the case of Embodiment 2. In the present embodiment, a common reference signal (clock generated by a 10 MHz crystal oscillator, etc.) is generally used for all radio sections as explained in Embodiment 1.

However, if different local signals are used for the radio transmission section and radio reception section, errors in the local signals generated by different synthesizers may cause subtle differences in carrier frequency fc between the transmitting side and receiving side. Thus, if the above phenomenon occurs, the reception phase changes with time even if the delay at the reception section does not change with time. This makes it impossible to detect accurate values when obtaining phase difference $\Delta\phi r$ and amplitude ratio Ar from the difference between a reference identification point and reception point.

Therefore, the calibration apparatus according to Embodiment 7 has a configuration using a common local signal (Lo signal) for the radio sections of the calibration apparatus according to Embodiment 2.

In FIG. 9, suppose local signal 916 is commonly supplied to all radio sections. The rest of the configuration and operation are the same as those in Embodiment 2. That is, calibration signal 901 is generated by code generator 902, modulated by modulator 903 and input to radio transmission section 904. Code generator 902 generates PN codes and orthogonal codes.

In radio transmission section 904, the transmission signal is quadrature-modulated, then up-converted to carrier frequency fc and output from transmission terminal 905. The signal output with carrier frequency fc is transmitted to radio reception sections 908 and 909 using cable 907 with attenuator 906 connected.

The reception outputs from the radio reception sections are input to correlators 910 and 911. Correlators 910 and 911 perform correlation detection at timings adjusted by delay circuit 912 and outputs correlation outputs 913 and 914, respectively.

Detection circuit 915 obtains, outputs or stores phase differences $\Delta\phi r1(Pm)$ and $\Delta\phi r2(Pm)$ and amplitude ratios Ar1(Pm) and Ar2(Pm) when reception electric field level Pm is changed by changing the attenuator set values.

As shown above, the calibration apparatus according to Embodiment 7 can eliminate the possibility of generating differences in carrier frequency fc between the transmitting side and receiving side by using a common local signal for the radio transmission section and radio reception section. This prevents the phase and amplitude from changing due to factors other than the delay characteristic and amplitude characteristic of the radio section, making it possible to detect accurate delays.

Figure 10:
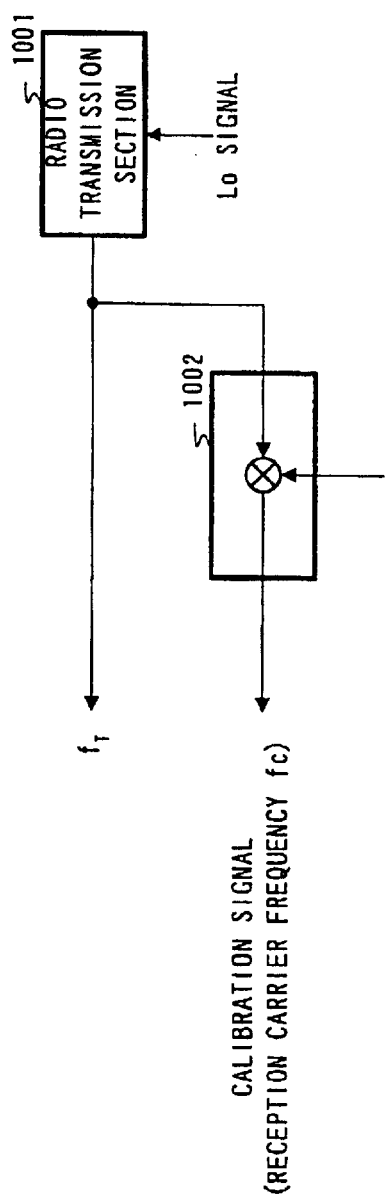
FIG. 10 is a block diagram showing a configuration of a frequency conversion section of the calibration apparatus according to Embodiment 7 above.

Moreover, as shown in FIG. 10, it is also possible to have a configuration in which the modulated signal output by radio transmission section 1001 of a TDMA-based array antenna radio apparatus is input to frequency converter 1002, converted to reception frequency fc and transmitted to the radio reception sections. This simple configuration by just providing frequency converter 1002 makes it possible to generate a wideband calibration signal similar to modulated signals used in actual communications.

EMBODIMENT 8

Figure 11:
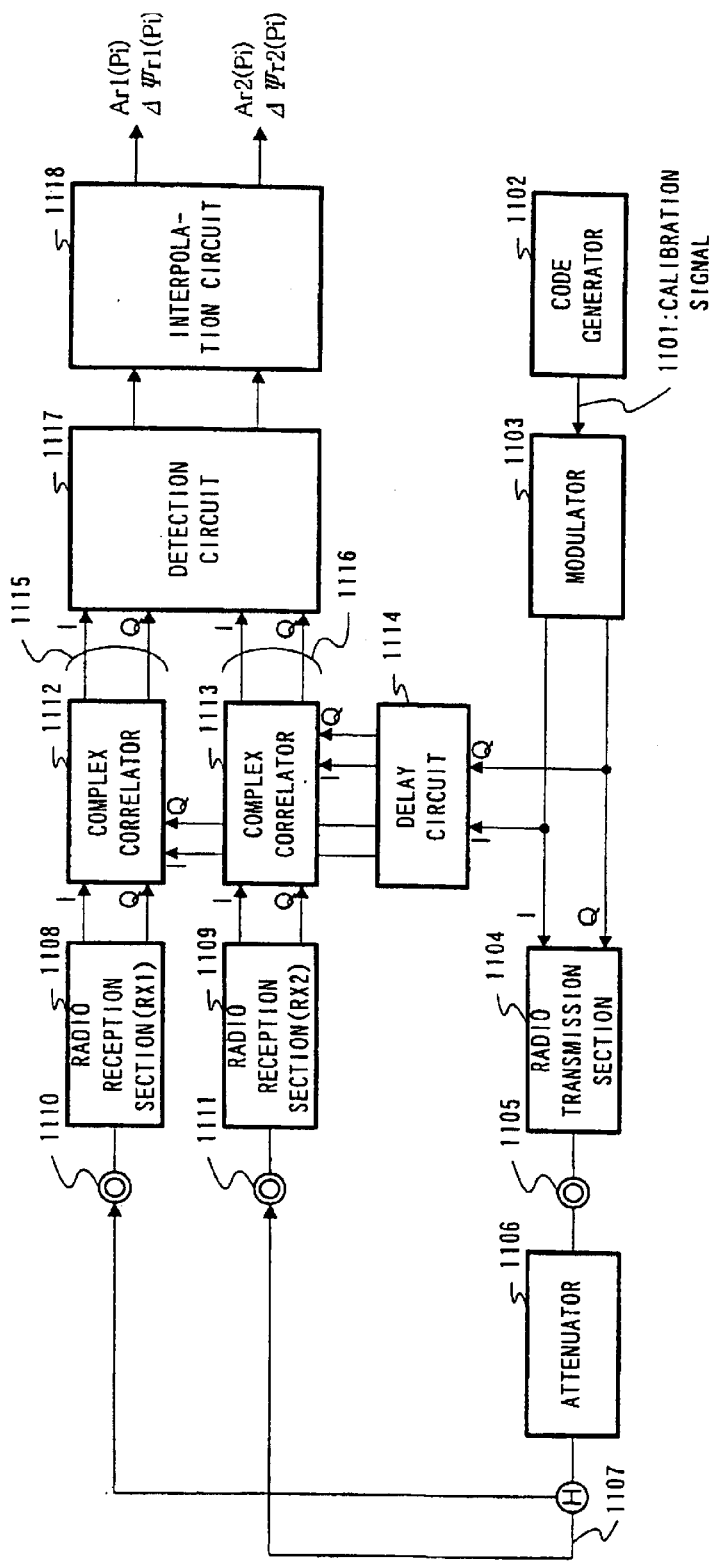
FIG. 11 is a block diagram showing an overall configuration of a calibration apparatus according to Embodiment 8 of the present invention.

Then, the calibration apparatus according to Embodiment 8 of the present invention is explained. FIG. 11 is a block diagram showing an overall configuration of the calibration apparatus according to Embodiment 8 of the present invention. The calibration apparatus according to Embodiment 8 has a configuration with an interpolation circuit provided at the output of the calibration apparatus of Embodiment 2. Furthermore, the calibration apparatus according to Embodiment 8 is equipped with 2 antennas as in the case of Embodiment 2.

In Embodiment 2 above, as shown in FIG. 4, if the radio reception section has delay characteristic $\Delta\phi ri(Pm)$ and amplitude characteristic Ari(Pm) according to reception electric field level Pm, it is necessary to measure delay characteristic $\Delta\phi ri(Pm)$ and amplitude characteristic Ari (Pm) when Pm is changed.

However, in FIG. 3, in order to obtain, output or store phase differences $\Delta\phi r1(Pm)$ and $\Delta\phi r2(Pm)$ when reception electric field level Pm is changed by changing the attenuator set values, and compensate variations in the delay characteristic and amplitude characteristic of the array antenna radio reception apparatus more accurately according to the reception power level, it is necessary to change the amount of variation of the attenuator finely over a wide range. Thus, the time required for calibration and the amount of data stored will become enormous.

Therefore, in addition to the calibration apparatus configuration shown in FIG. 3, Embodiment 8 provides interpolation circuit 1118 that obtains a delay difference and amplitude ratio corresponding to the reception power level other than the measured reception power level by performing interpolation processing using the actually measured delay differences and amplitude ratios of the radio sections.

In FIG. 11, calibration signal 1101 is generated by code generator 1102, modulated by modulator 1103 and input to radio transmission section 1104. Code generator 1102 generates PN codes and orthogonal codes.

In radio transmission section 1104, the transmission signal is quadrature-modulated, then up-converted to carrier frequency fc and output from transmission terminal 1105. fc is a reception carrier frequency of the present system. The signal output with carrier frequency fc is transmitted from transmission terminal 1105 to antenna connection terminals 1110 and 1111 of radio reception sections 1108 and 1109, respectively using cable 1107 with attenuator 1106 connected.

The reception outputs of the radio reception sections are input to correlators 1112 and 1113. Complex correlators 1112 and 1113 perform correlation detection at timings adjusted by delay circuit 1114 and output correlation outputs 1115 and 1116, respectively.

Detection circuit 1117 obtains and outputs phase differences $\Delta\phi r1(Pm)$ and $\Delta\phi r2$ (Pm), and amplitude ratios Ar1 (Pm) and Ar2(Pm) when reception electric field level Pm is changed by changing the attenuator set values.

Interpolation circuit 1118 also obtains phase characteristic $\Delta\phi ri$ (Pm) and amplitude characteristic Ari(Pm) of reception electric field levels other than measured electric field level Pm above, and then outputs phase characteristic $\Delta\phi ri$ (Pm) and amplitude characteristic Ari(Pm).

For example, in FIG. 4, suppose phase differences $\Delta\phi ri$ (P0) and $\Delta\phi ri$ (P2), and amplitude ratio Ari (P0) and Ari (P2) at reception electric field level P0 and reception electric field level P2 are the actually measured values. At this time, interpolation circuit 1118 can obtain phase characteristic $\Delta\phi ri$ (P1) and amplitude characteristic Ari(P1) at unmeasured reception electric field level P1 using first-degree linear interpolation as follows:

$$\Delta\phi ri(P1)=(t\cdot\Delta\phi ri(P0)+s\cdot\Delta\phi ri(P2))/(s+t)$$

$$Ari(P1)=(t\cdot Ari(P0)+s\cdot Ari(P2))/(s+t)$$

where $$P1=(t\cdot P0+s\cdot P2)/(s+t),\ 0<s,\ t<1$$

As shown above, the calibration apparatus according to Embodiment 8 of the present invention can obtain through interpolation processing the phase difference and amplitude ratio at the reception field level to be compensated from the data of the delay characteristic and amplitude characteristic measured and stored near the reception electric field level to be compensated. This makes it possible not only to compensate delay differences and amplitude differences in an array antenna radio reception apparatus accurately according to the reception electric field level but also to reduce sampling points of reception power level Pm to be measured.

Here, the measured values used in interpolation processing need not always be delay differences and amplitude ratios from reference identification points, but can also be calculated based on the correlation output detected by correlation.

For example, suppose actually measured correlation output 1115 is expressed by correlation vector Ri (i=1, 2) and correlation vectors at reception electric field levels P0 and P2 are Ri(p0) and Ri(p2), respectively. Interpolation circuit 1118 can obtain correlation vector Ri(P1) at unmeasured reception field level P1 through first-order linear interpolation as follows:

$$Ri(P1)=(t\cdot Ri(P0)+s\cdot Ri(P2))/(s+t)$$

where $$P1=(t\cdot P0+s\cdot P2)/(s+t),\ 0<s,\ t<1$$

Interpolation circuit 1118 can obtain phase characteristic $\Delta\phi ri$ (P1) and amplitude characteristic Ari(P1) at unmeasured reception electric field level P1 based on Ri(P1) above.

Interpolation circuit 1118 can also obtain an offset value when carrying out compensation to match the phase characteristic and amplitude characteristic of the radio reception section with radio reception section RX1 (1108) from correlation vector Ri(P1) obtained through interpolation processing. That is, suppose the offset value is vector Zri(Pm) (i=1, 2, m=0, 1, 2, . . . ), then:

$$Zr1(P1)=1$$

$$Zr2(P1)=R1(P1)/R2(P1)\times R2(P1)^*/|R2(P1)|2\ (\text{* denotes complex conjugate.})$$

EMBODIMENT 9

Figure 12:
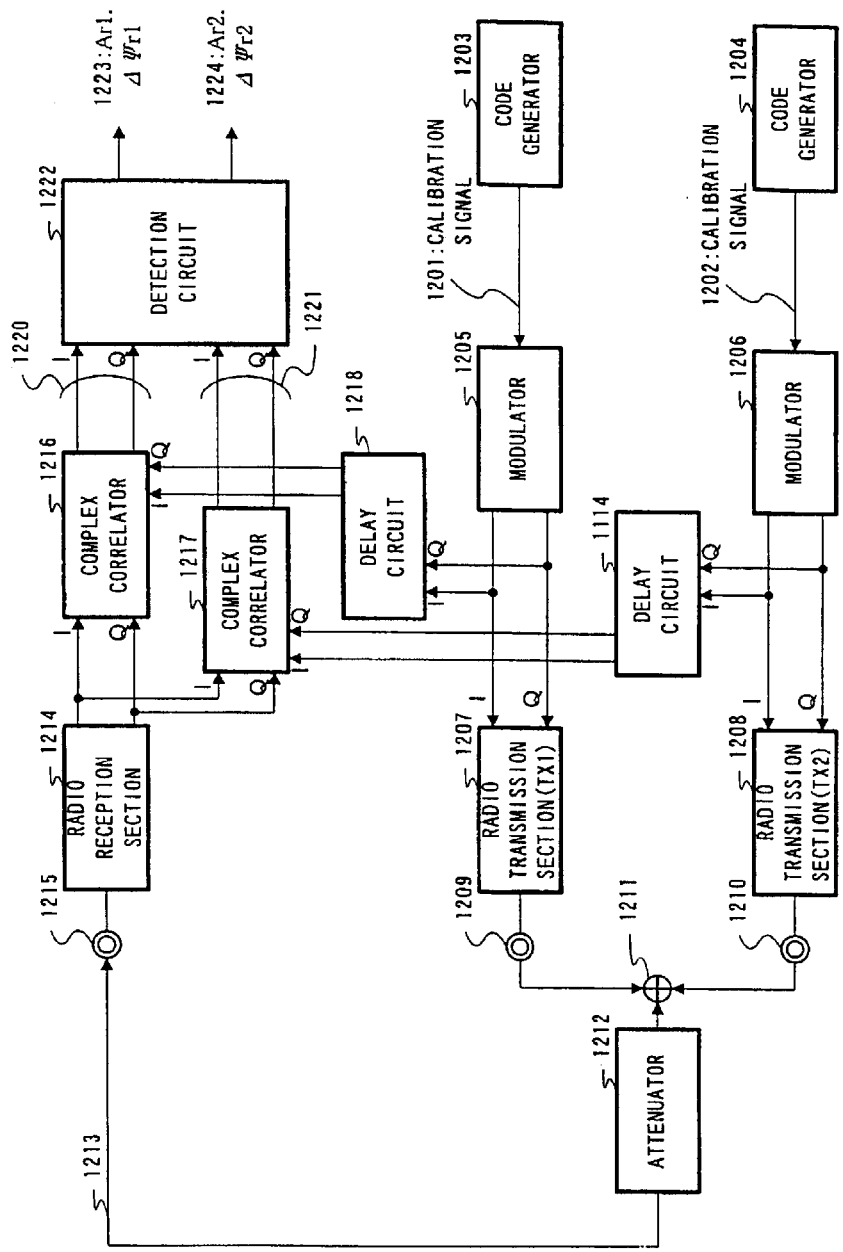
FIG. 12 is a block diagram showing an overall configuration of a calibration apparatus according to Embodiment 9 of the present invention.
Figure 26:
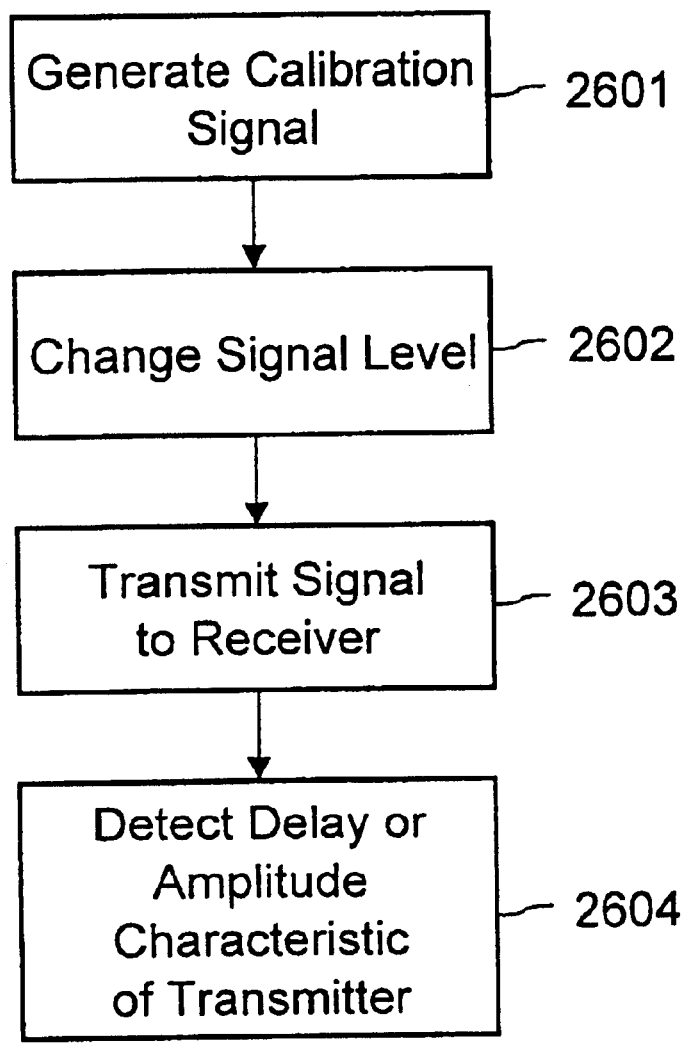
FIG. 26 illustrates an operation of the calibration apparatus illustrated by FIG. 12.

Then, the calibration apparatus according to Embodiment 9 of the present invention is explained. FIG. 12 is a block diagram showing an overall configuration of the calibration apparatus according to Embodiment 9 of the present invention and FIG. 26 illustrates an operation of this calibration apparatus. As shown in FIG. 12, the calibration apparatus according to Embodiment 9 is equipped with 2 antennas as in the case of the embodiment above.

In FIG. 12, calibration signals 1201 and 1202 are modulated by modulators 1205 and 1206. In Embodiment 9, it is assumed that the modulation system used by the calibration apparatus is the same system as that of normal communication, QPSK modulation, for example, and the radio sections perform quadrature modulation and quadrature detection.

Calibration signals 1201 and 1202 to be input to their respective radio transmission sections are generated (S2601) by code generators 1203 and 1204, respectively, then modulated by modulators 1205 and 1206 and input to radio transmission sections 1207 and 1208, respectively. The code generators generate different PN codes and orthogonal codes. PN codes require correlation time long enough to reduce correlation among codes. FIG. 2A shows a constellation of the modulated signal.

The transmission signals are quadrature-modulated by radio transmission sections 1207 and 1208, then up-converted to carrier frequency fc and input from antenna connection terminals 1209 and 1210 to adder 1211, added up and output by adder 1211. fc is a reception carrier frequency of the present system.

The signal output with carrier frequency fc is transmitted (S2603) from adder 1211 to reception terminal 1215 of radio reception section 1214 using cable 1213 with attenuator 1212 connected to change (S2602) the signal level of the signal output with carrier frequency fc. At this time, suppose the cables are equal in length with sufficient accuracy relative to the wavelength of the carrier frequency and the delays by the adder and attenuator have already been measured.

The reception output of radio reception section 1214 is input to correlators 1216 and 1217. Correlators 1216 and 1217 perform correlation detection at timings adjusted by delay circuit 1218 and output correlation outputs 1220 and 1221, respectively. At this time, since PN codes or orthogonal codes, which vary for every radio transmission section, are used as calibration signals, delays for every radio transmission section are obtained through correlation outputs 1220 and 1221 output from correlators 1216 and 1217, respectively.

Detection circuit 1222 obtains (S2604) (amplitude ratio, phase difference)=(Ar1, $\Delta\phi r1$) 1223 by comparing reception signal point (hereinafter referred to as "reception point") r1 obtained from correlation output 1220 and an identification point to be a reference (hereinafter referred to as "reference identification point"). The phase difference obtained here corresponds to the delay of the remainder obtained by dividing total delay D of delay Dt of radio transmission section 1207, delay Da of adder 1209, delay Dk (including a delay in the attenuator) of cable 1211 and delay Dr1 of radio reception section 1212 (D=Dt+Da+Dk+Dr1) by wavelength Xc of carrier frequency fc.

Likewise, detection circuit. 1222 obtains (2604) (amplitude ratio, phase difference)=(Ar2, $\Delta\phi$r2) 1224 by comparing reception point r2 obtained from correlation output 1221 and a reference identification point.

FIG. 2B shows the constellation on the radio section TX1 (1207) side and the amplitude ratio and phase difference from a reference identification point and FIG. 2C shows the constellation on the radio section TX2 (1208) side and the amplitude ratio and phase difference from the reference identification point.

As shown above, when detecting the delay characteristic and amplitude characteristic of the radio transmission sections in TDMA transmission, the calibration apparatus according to Embodiment 9 of the present invention can detect more accurate delay differences and amplitude ratios by using a signal with the same bandwidth as or close to that of the modulated signal used in an actual communication as the calibration signal and by comparing the correlation output of the output signal from the radio reception section and a reference identification point.

The present embodiment can also solve the problem that the directivity pattern including null points obtained from weight convergence results is different from the actual directivity pattern by multiplying the input signal of each radio transmission section by the detected phase difference and amplitude ratio as offsets.

Embodiment 9 above explained the case where QPSK modulation is used as the modulation system and the radio sections perform quadrature modulation and quadrature detection, but quadrature modulation and quadrature detection are not indispensable for the present embodiment, and it is obvious that similar detection is possible using other systems. It is obvious that Embodiment 9 can easily measure only either one of the phase characteristic or amplitude characteristic.

The detected values need not always be delay differences from reference identification points and amplitude ratios, but it is also possible to use offset values between radio transmission sections calculated based on the correlation output as the detected values. The calibration apparatus can also output or store the correlation values as they are. In this case, the array antenna radio transmission apparatus perform calculations to obtain offset values to compensate delay differences and amplitude differences of each radio transmission section using the stored correlation values. Then, the array antenna radio transmission apparatus can prevent the directivity pattern obtained from the weight convergence result from being different from the actual directivity pattern by compensating variations in the delay characteristic and amplitude characteristic for the signal input to radio transmission sections TX1 (1207) and TX2 (1208).

Moreover, all the cables were supposed to be equal in length, but even if they are different in length, if the delay and attenuation are at least known beforehand, it is possible to detect the phase difference and amplitude ratio by compensating the known delay and attenuation above. Here, suppose all reference signals (clock generated by a crystal oscillator of 10 MHz, for example) used at the radio sections are common to those radio sections.

Furthermore, as in the case of Embodiment 8, it is also possible to provide an interpolation circuit at the output of detection circuit 1222 that obtains the delay difference and amplitude ratio for the reception power level other than the measured reception power level by means of interpolation processing using the actually measured delay difference and amplitude ratio of each reception section.

EMBODIMENT 10

Figure 13:
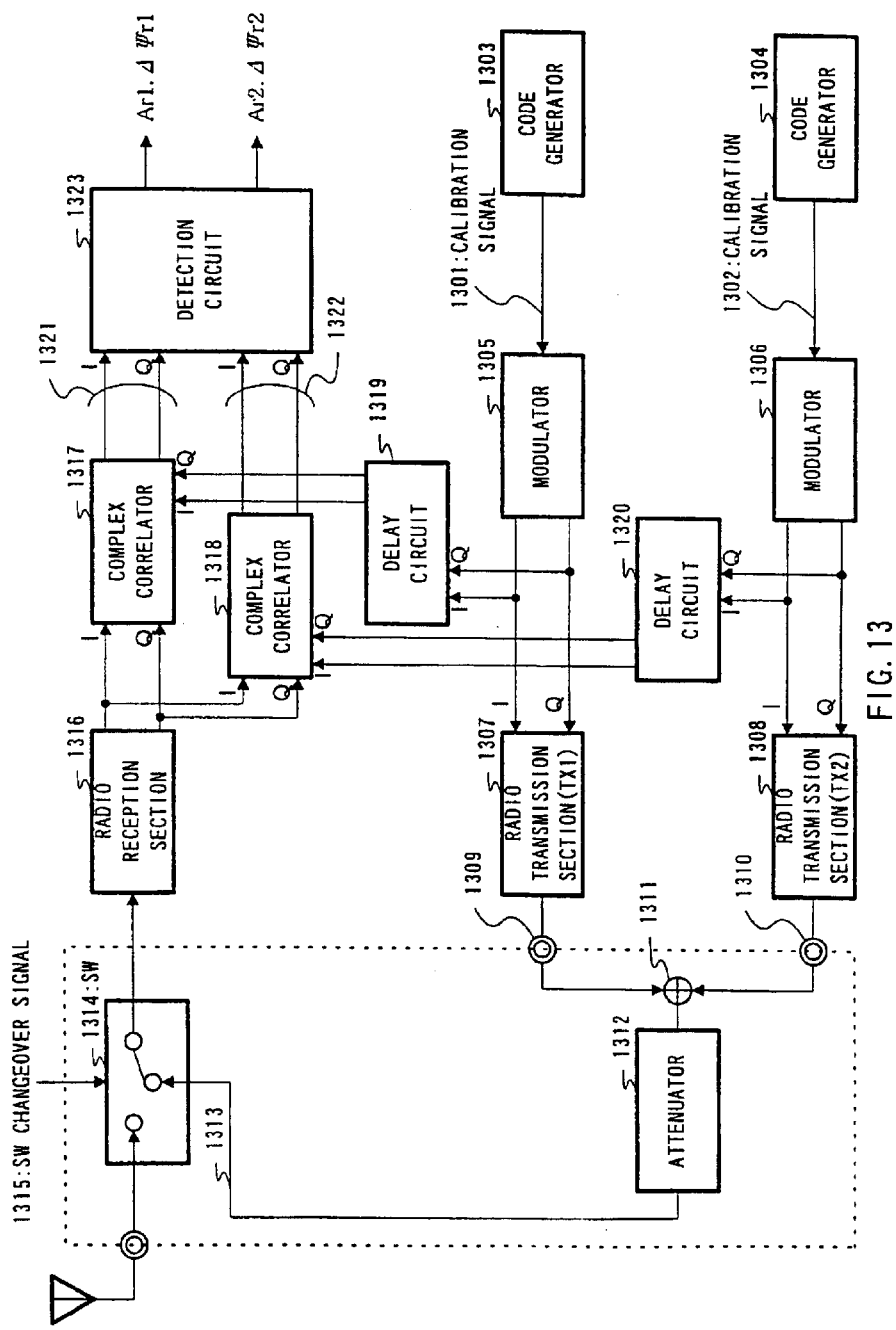
FIG. 13 is a block diagram showing an overall configuration of a calibration apparatus according to Embodiment 10 of the present invention.

Then, the calibration apparatus according to Embodiment 10 of the present invention is explained. FIG. 13 is a block diagram showing an overall configuration of the calibration apparatus according to Embodiment 10 of the present invention. The calibration apparatus according to Embodiment 10 has the configuration of the calibration apparatus according to Embodiment 9 with a changeover switch added. As shown in FIG. 13, the calibration apparatus according to Embodiment 10 is equipped with 2 antennas.

In Embodiment 10, the operations until the calibration signal is output from adder 1311 are the same as those of Embodiment 9. That is, calibration signals 1301 and 1302 are generated by code generators 1303 and 1304, modulated by modulators 1305 and 1306 and input to radio transmission sections 1307 and 1308. The code generators generate PN codes and orthogonal codes. PN codes require correlation time long enough to reduce correlation among codes.

The transmission signals are quadrature-modulated by radio transmission sections 1307 and 1308, then up-converted to carrier frequency fc and input from antenna connection terminals 1309 and 1310 to adder 1311 and added up and output by adder 1311. fc is a reception carrier frequency of the present system. The signal output with carrier frequency fc is transmitted from adder 1311 to changeover switch 1314 using cable 1313 with attenuator 1312 connected.

Changeover switch 1314 switches between the reception signal from the antenna and calibration modulated signal according to SW changeover signal 1315. Then, the signal from the changeover switch is transmitted to radio reception section 1316. The operations hereafter are the same as those in Embodiment 9 above. That is, the reception outputs of the radio reception section are input to complex correlators 1317 and 1318. Complex correlators 1317 and 1318 perform correlation detection at timings adjusted by delay circuits 1319 and 1320 and output correlation outputs 1321 and 1322, respectively.

At this time, since PN codes or orthogonal codes, which differ for every radio transmission section, are used as calibration signals, delays for every radio transmission section are obtained by correlation outputs 1321 and 1322 output from complex correlators 1317 and 1318, respectively.

Detection circuit 1323 obtains, outputs or stores phase differences $\Delta\phi$r1 and $\Delta\phi$r2, and amplitude ratios Ar1 and Ar2.

As shown above, the calibration apparatus according to Embodiment 10 of the present invention can measure the delay characteristic and amplitude characteristic on an as-needed basis by controlling switch changeover signals. This makes it possible to accurately compensate variations even if the delay characteristic and amplitude characteristic above change with time depending on the operating environment, etc.

EMBODIMENT 11

Figure 14:
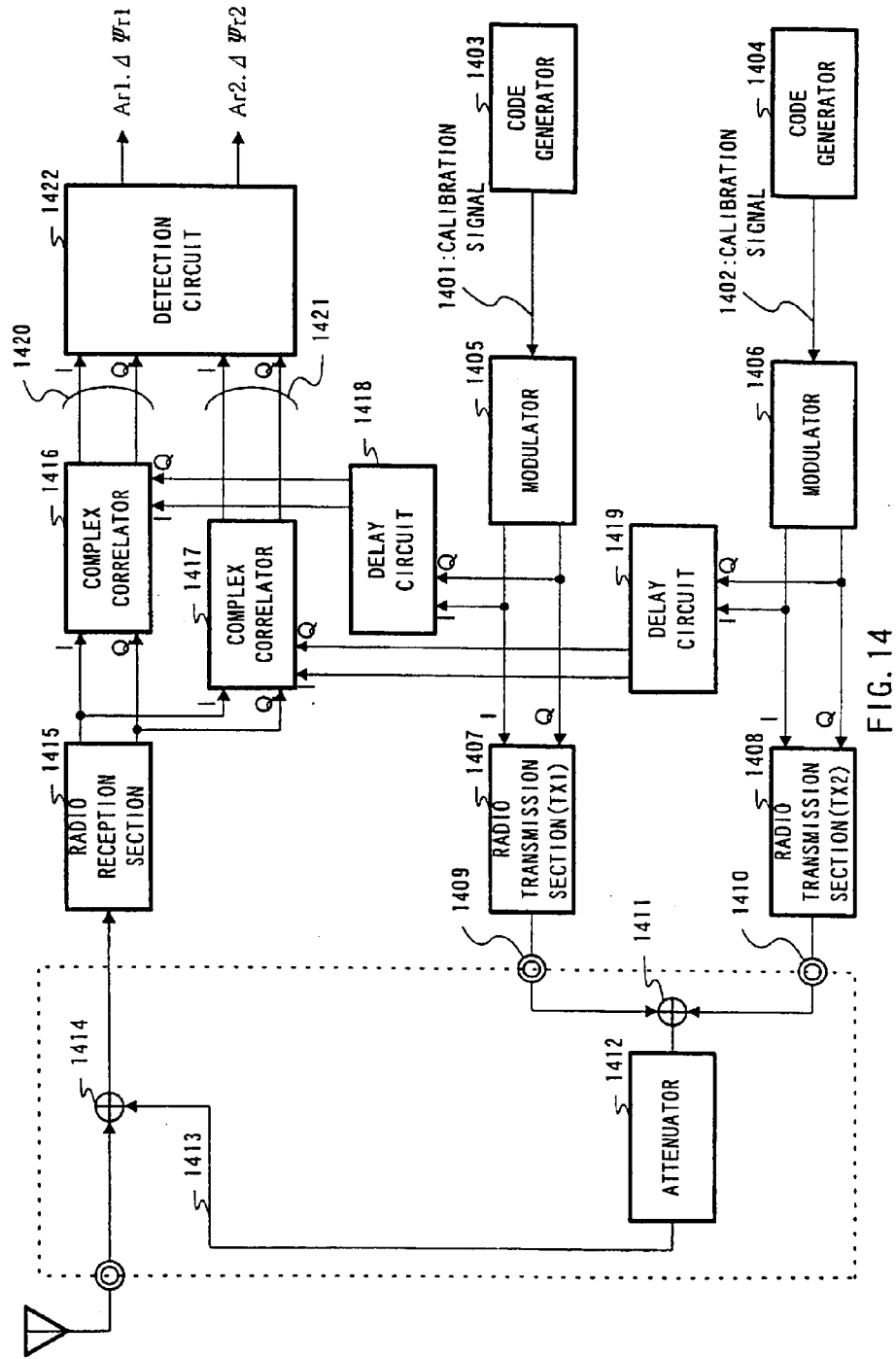
FIG. 14 is a block diagram showing an overall configuration of a calibration apparatus according to Embodiment 11 of the present invention.

Then, the calibration apparatus according to Embodiment 11 of the present invention is explained. FIG. 14 is a block diagram showing an overall configuration of the calibration apparatus according to Embodiment 11 of the present invention. As shown in FIG. 14, the calibration apparatus according to Embodiment 11 has the configuration of the calibration apparatus according to Embodiment 9 with a multiplexing circuit added. The calibration apparatus according to Embodiment 11 is also equipped with 2 antennas.

In Embodiment 11, the operations until the calibration signal is output from the adder are the same as those of Embodiment 9. That is, calibration signals 1401 and 1402 are generated by code generators 1403 and 1404, modulated by modulators 1405 and 1406 and input to radio transmission sections 1407 and 1408. The code generators generate PN codes and orthogonal codes. PN codes require correlation time long enough to reduce correlation among codes.

The transmission signals are quadrature-modulated by radio transmission sections 1407 and 1408, then up-converted to carrier frequency fc and input from antenna connection terminals 1409 and 1410 to adder 1411 and added up and output by adder 1411. fc is a reception carrier frequency of the present system. The signal output with carrier frequency fc is transmitted from adder 1411 to multiplexing circuit 1414 using cable 1413 with attenuator 1412 connected.

Multiplexing circuit 1414 multiplexes the reception signal from the antenna and the calibration modulated signal. Then, the multiplexed signal is transmitted to radio reception section 1415. The operations hereafter are the same as those in Embodiment 9 above. That is, the reception outputs of the radio reception section are input to complex correlators 1416 and 1417. Complex correlators 1416 and 1417 perform correlation detection at timings adjusted by delay circuits 1418 and 1419 and output correlation outputs 1420 and 1421, respectively.

At this time, since PN codes or orthogonal codes, which differ for every radio transmission section, are used as calibration signals, delays for every radio transmission section are obtained by the correlation outputs 1420 and 1421 output from complex correlators 1416 and 1417.

Detection circuit 1422 obtains, outputs or stores phase differences Δφr1 and Δφr2, and amplitude ratios Ar1 and Ar2.

As shown above, the calibration apparatus according to Embodiment 11 of the present invention can measure the delay characteristic and amplitude characteristic all the time or on an as-needed basis without interruption of normal communications. This makes it possible to accurately compensate variations even if the delay characteristic and amplitude characteristic above change with time depending on the operating environment, etc. If no measurement is performed, it is possible to prevent any calibration signal that can be a noise component for reception signals from being output by turning off the power to the radio transmission sections.

EMBODIMENT 12

Figure 15:
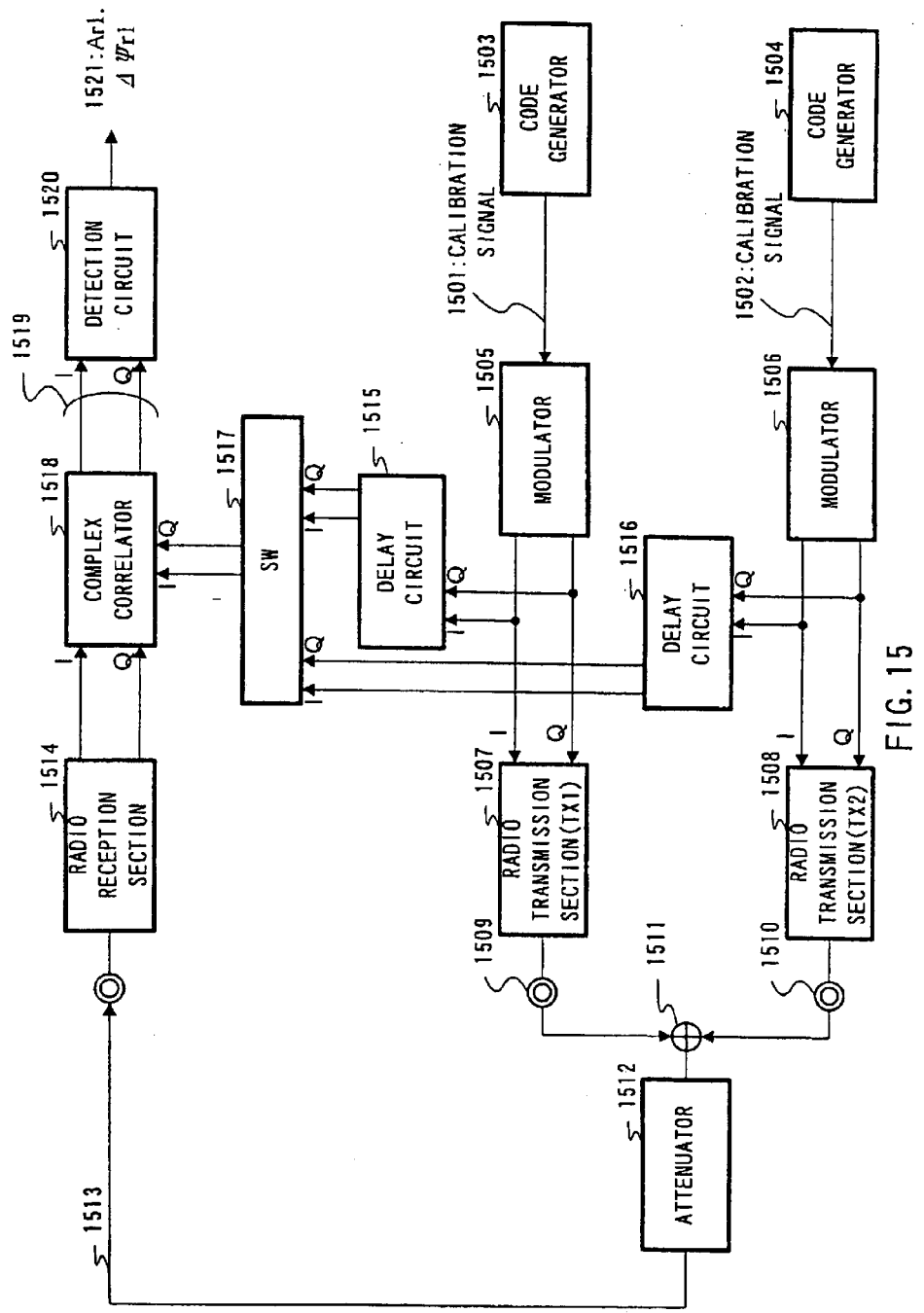
FIG. 15 is a block diagram showing an overall configuration of a calibration apparatus according to Embodiment 12 of the present invention.

Then, the calibration apparatus according to Embodiment 12 of the present invention is explained. FIG. 15 is a block diagram showing an overall configuration of the calibration apparatus according to Embodiment 12 of the present invention. The calibration apparatus according to Embodiment 12 is also equipped with 2 antennas as in the case of Embodiment 9.

In Embodiment 12, the operations until the calibration signal is output from the adder are the same as those of Embodiment 9. That is, calibration signals 1501 and 1502 are generated by code generators 1503 and 1504, modulated by modulators 1505 and 1506 and input to radio transmission sections 1507 and 1508. The code generators generate PN codes and orthogonal codes. PN codes require correlation time long enough to reduce correlation among codes.

The transmission signals are quadrature-modulated by radio transmission sections 1507 and 1508, then up-converted to carrier frequency fc and input from antenna connection terminals 1509 and 1510 to adder 1511 and added up and output by adder 1511. fc is a reception carrier frequency of the present system. The signal output with carrier frequency fc is transmitted from adder 1511 to radio reception section 1514 using cable 1513 with attenuator 1512 connected.

The outputs of delay circuits 1515 and 1516 are switched by changeover switch 1517 and input to complex correlator 1518. Then, complex correlator 1518 detects correlation with the output of radio reception section 1514 at the timing above and outputs correlation output 1519. At this time, since PN codes or orthogonal codes, which differ for every radio transmission section, are used as calibration signals, delays for every radio transmission section are obtained by the correlation output 1519 output from correlator 1518.

Detection circuit 1520 obtains, outputs or stores amplitude ratio Ari and phase difference Δφri 1521. Therefore, if changeover switch 1517 selects the output of delay circuit 1515, correlator 1519 performs correlation detection and outputs correlation output 1519. Detection circuit 1520 obtains, outputs or stores amplitude ratio Ar1 and phase difference Δφ1521.

On the other hand, if changeover switch 1517 selects the output of delay circuit 1516, correlator 1518 performs correlation detection and outputs correlation output 1519. Detection circuit 1520 obtains, outputs or stores amplitude ratio Ar2 and phase difference Δφr1521.

As shown above, according to the calibration apparatus according to Embodiment 12 of the present invention, if the delay characteristics and amplitude characteristics of a plurality of radio transmission sections are obtained by means of time division by changing the switch, it is not necessary to perform correlation calculations and phase detection for every radio transmission section simultaneously, making it possible to reduce the circuit scale of the calibration apparatus.

EMBODIMENT 13

Figure 16:
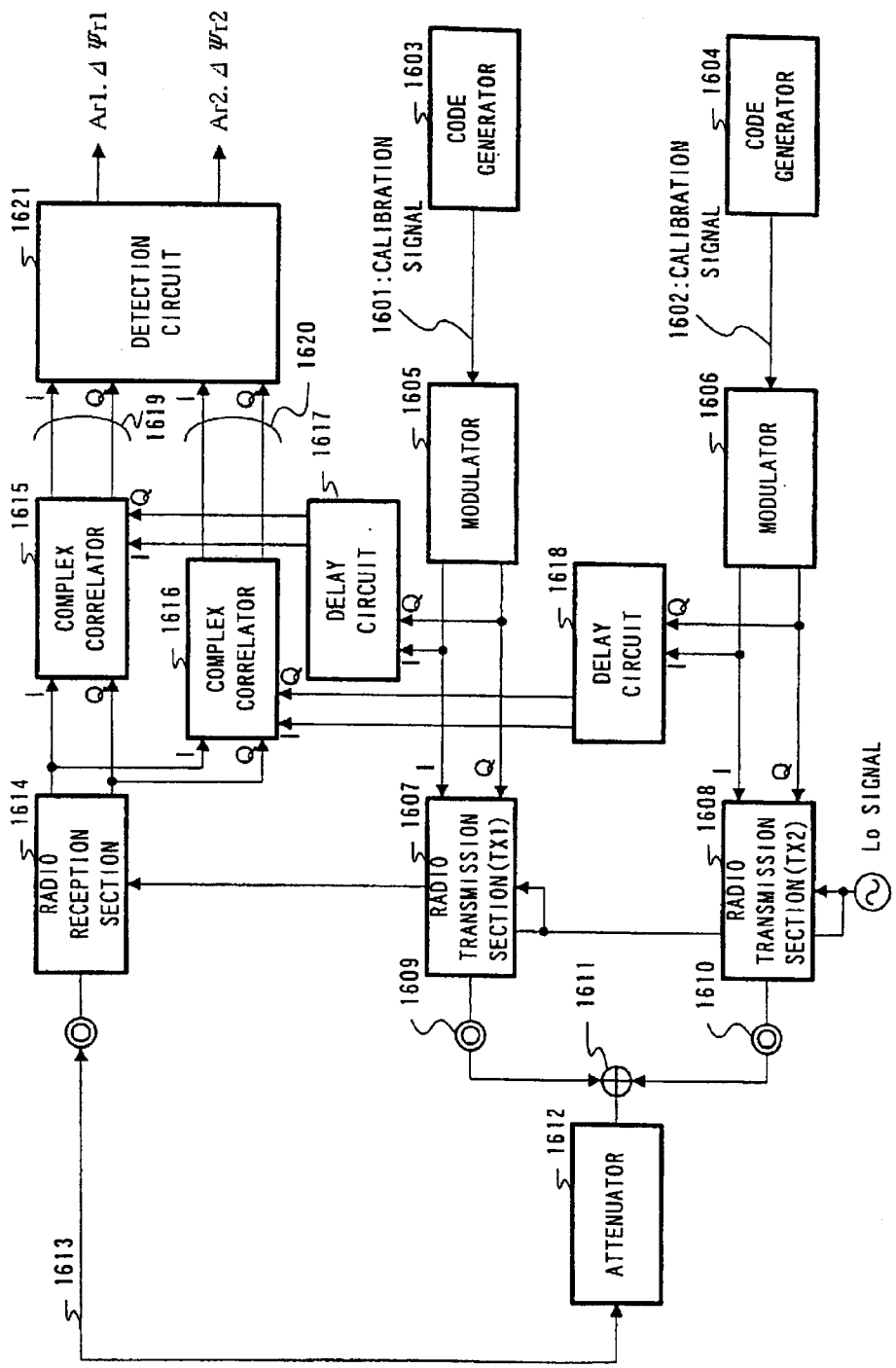
FIG. 16 is a block diagram showing an overall configuration of a calibration apparatus according to Embodiment 13 of the present invention.

Then, the calibration apparatus according to Embodiment 13 of the present invention is explained. FIG. 16 is a block diagram showing an overall configuration of the calibration apparatus according to Embodiment 13 of the present invention. The calibration apparatus according to Embodiment 13 is also equipped with 2 antennas. Moreover, as explained in Embodiment 9, suppose all reference signals (clock generated by a crystal oscillator of 10 MHz, for example) used at the radio sections are common to those radio sections.

However, if different local signals are used for the radio transmission section and radio reception section, errors in the local signals generated by different synthesizers may cause subtle differences in carrier frequency fc between the transmitting side and receiving side. Thus, if the above phenomenon occurs, the reception phase changes with time even if the delay at the reception section does not change with time. This makes it impossible to detect accurate values when obtaining phase difference Δφr and amplitude ratio Ar from the difference between a reference identification point and reception point.

Embodiment 13 has a configuration using a common local signal (Lo signal) for the radio sections in the calibration apparatus according to Embodiment 9.

In FIG. 16, suppose local signal 1622 is commonly supplied to all radio sections. The rest of the configuration and operation are the same as those in Embodiment 9. That is, calibration signals 1601 and 1602 are generated by code generators 1603 and 1604, modulated by modulators 1605 and 1606 and input to radio transmission sections 1607 and 1608. The code generators generate PN codes and orthogonal codes. PN codes require correlation time long enough to reduce correlation among codes.

The transmission signals are quadrature-modulated by radio transmission sections 1607 and 1608, then up-converted to carrier frequency fc and input from antenna connection terminals 1609 and 1610 to adder 1611, added up and output by adder 1611. fc is the reception carrier frequency of the present system. The signal output with carrier frequency fc is transmitted from adder 1611 to radio reception section 1614 using cable 1613 with attenuator 1612 connected.

The reception outputs from the radio reception section are input to complex correlators 1615 and 1616. Complex correlators 1615 and 1616 perform correlation detection at timings adjusted by delay circuits 1617 and 1618 and output correlation outputs 1619 and 1620.

At this time, since PN codes or orthogonal codes, which vary for every radio transmission section, are used as calibration signals, delays for every radio transmission section are obtained through correlation outputs 1619 and 1620 output from complex correlators 1615 and 1616, respectively. Detection circuit 1621 obtains, outputs or stores phase differences $\Delta\phi r1$ and $\Delta\phi r2$ and amplitude ratios Ar1 and Ar2.

As shown above, the calibration apparatus according to Embodiment 13 of the present invention can eliminate the possibility of generating differences in carrier frequency fc on the transmitting side and receiving side by using a common local signal for the radio transmission section and radio reception section. This prevents the phase and amplitude from changing due to factors other than the delay characteristic and amplitude characteristic of the radio section, making it possible to detect accurate delays.

EMBODIMENT 14

Figure 17:
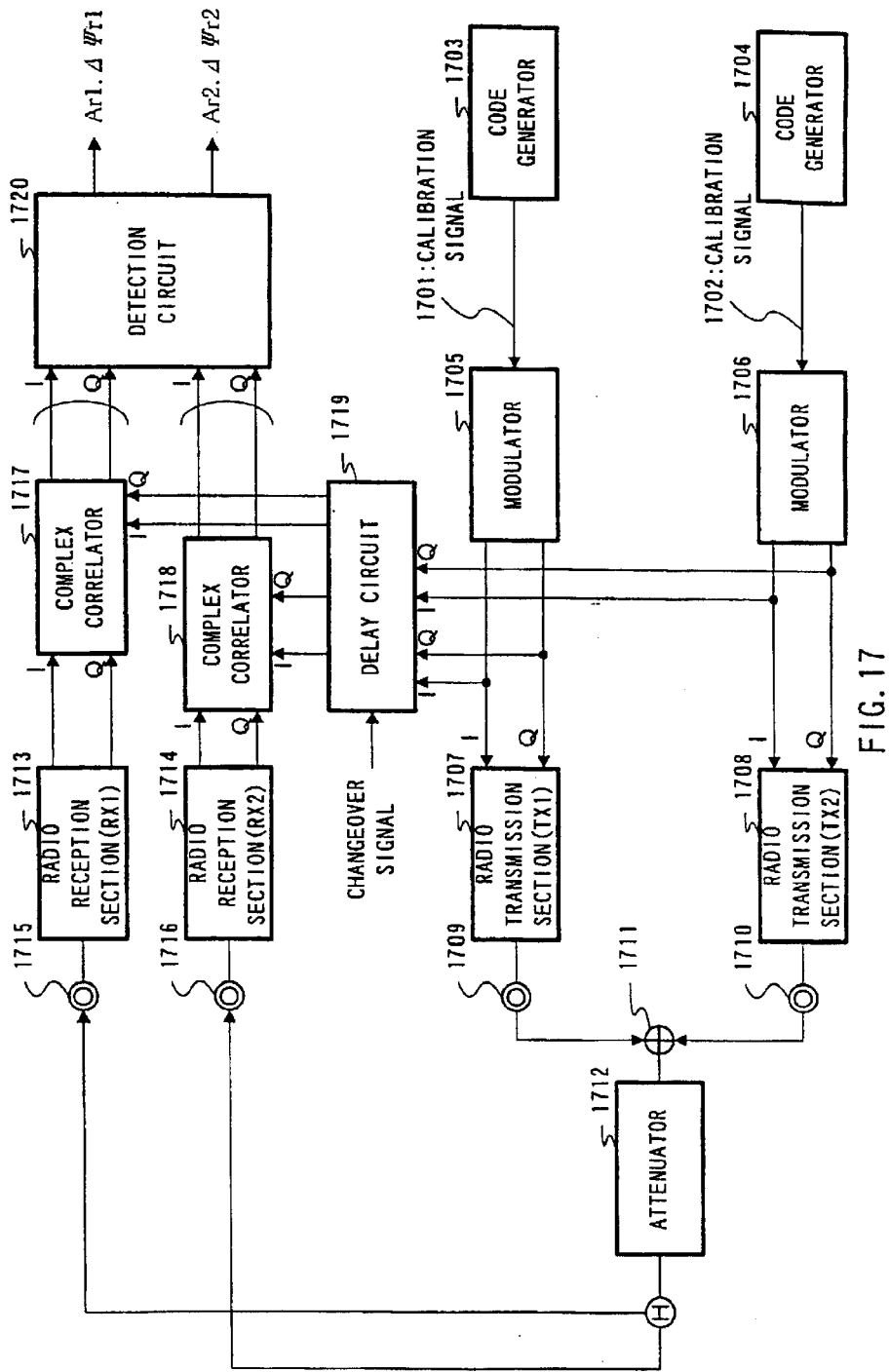
FIG. 17 is a block diagram showing an overall configuration of a calibration apparatus according to Embodiment 14 of the present invention.
Figure 18:
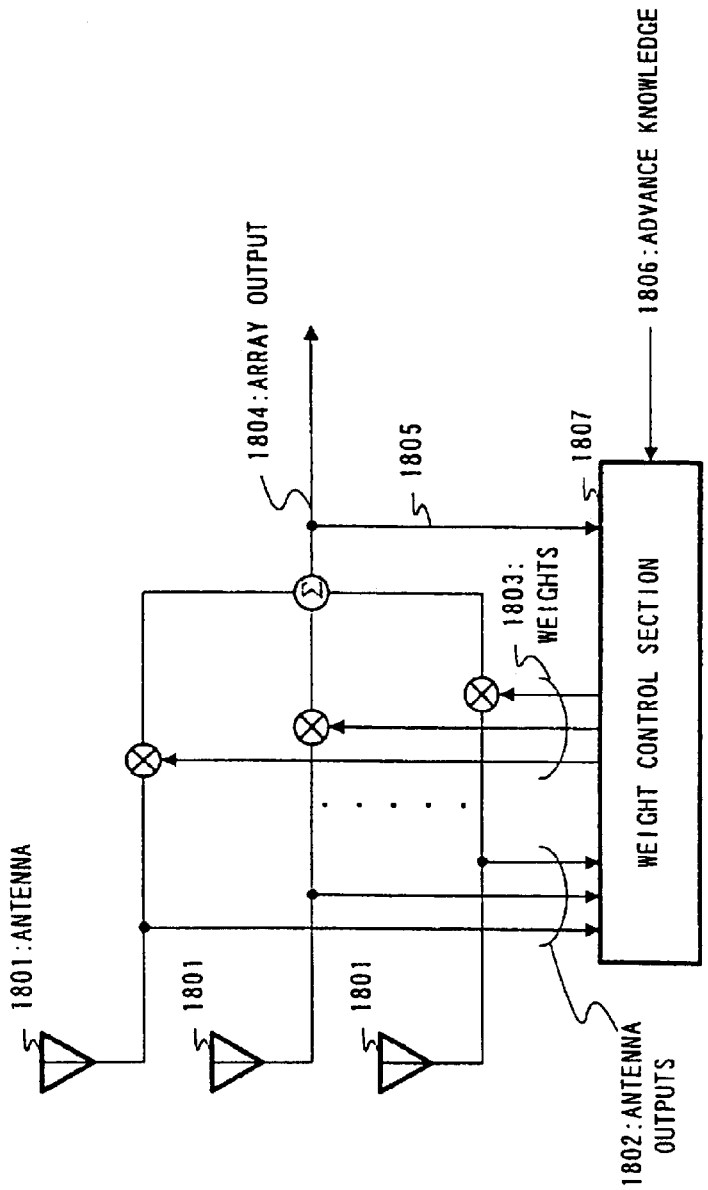
FIG. 18 is a drawing showing an overall configuration of a conventional reception adaptive array antenna.
Figure 19:
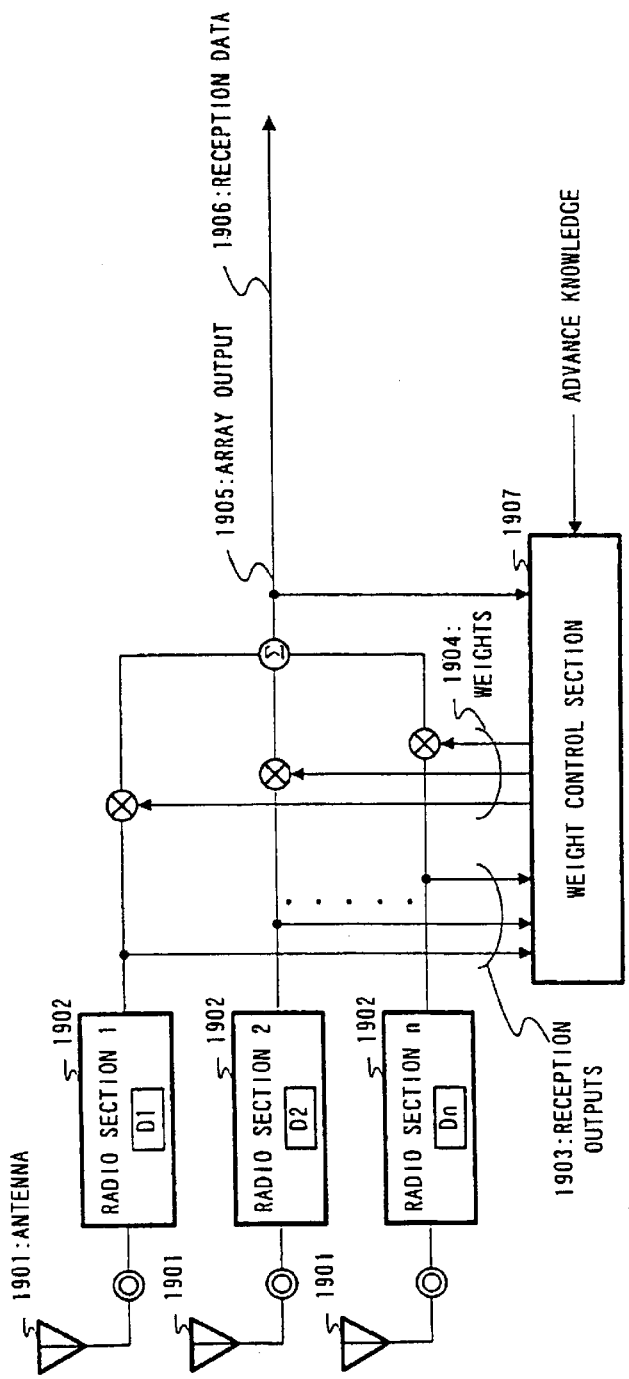
FIG. 19 is a drawing showing an overall configuration of a conventional TDMA reception adaptive array antenna.
Figure 20:
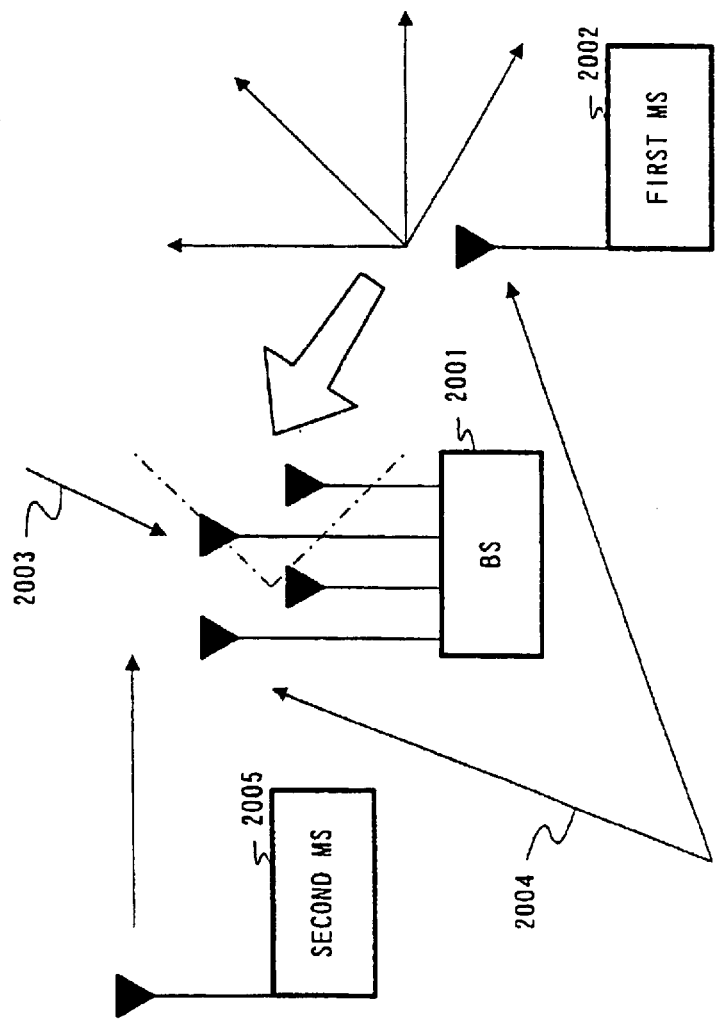
FIG. 20 is a conceptual drawing of TDMA transmission using a conventional adaptive array antenna on the receiving side.
Figure 21:
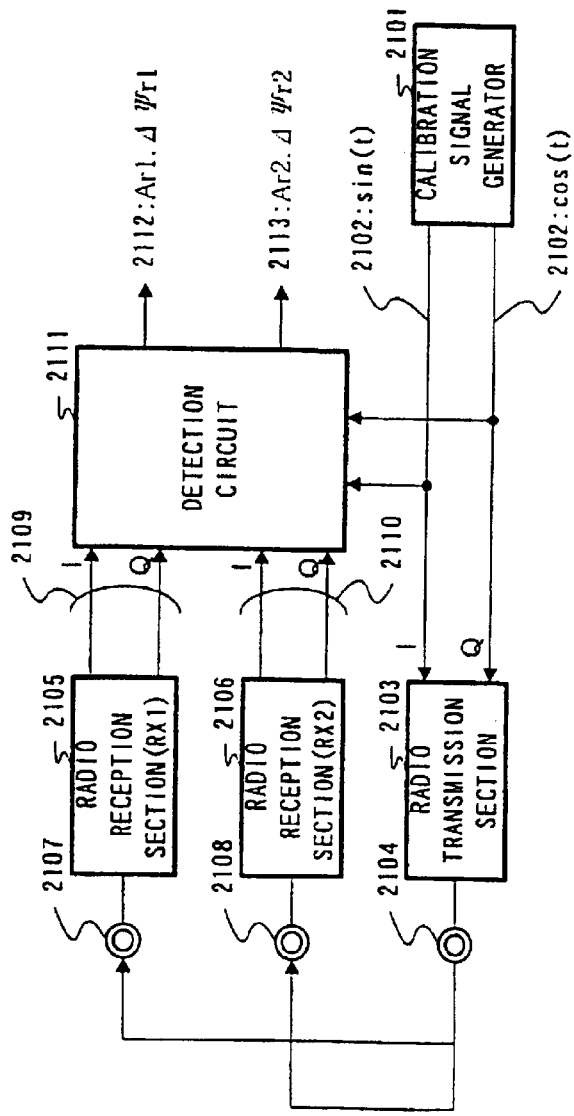
FIG. 21 is a block diagram showing an overall configuration of a calibration apparatus in a conventional reception section.
Figure 22:
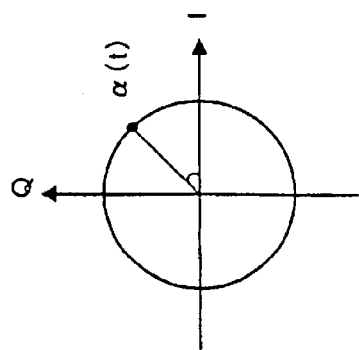
FIG. 22 is a drawing showing a constellation in an IQ plane of a tone signal used for the conventional calibration apparatus.
Figure 23:
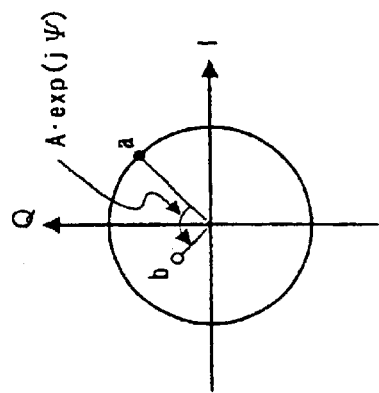
FIG. 23 is a drawing showing a constellation example of tone signal a(t) and detection ouput b(t) at time t of the conventional calibration apparatus.
Figure 24:
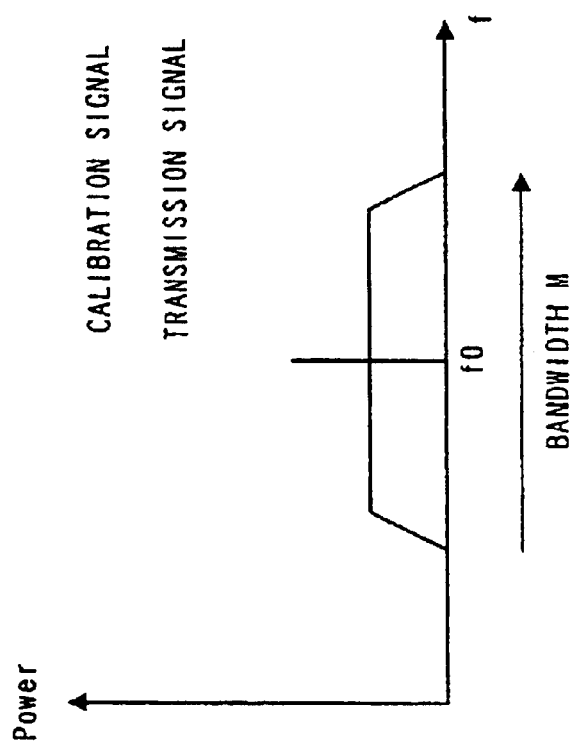
FIG. 24 is a drawing showing a spectrum status of a conventional calibration signal and transmission signal.

Then, the calibration apparatus according to Embodiment 14 of the present invention is explained. FIG. 17 is a block diagram showing an overall configuration of the calibration apparatus according to Embodiment 14 of the present invention. As shown in FIG. 17, the calibration apparatus according to Embodiment 14 has a configuration combining Embodiment 1 and Embodiment 9 above and enabling reception calibration and transmission calibration to be carried out on a same circuit. The calibration apparatus according to Embodiment 14 is equipped with 2 antennas.

In FIG. 17, calibration signals 1701 and 1702 are modulated by modulators 1705 and 1706. In Embodiment 14, it is assumed that the modulation system used by the calibration apparatus is the same system as that of normal communication, QPSK modulation, for example, and the radio sections perform quadrature modulation and quadrature detection.

Calibration signals 1701 and 1702 to be input to their respective radio transmission sections are generated by code generators 1703 and 1704, respectively, then modulated by modulators 1705 and 1706 and input to radio transmission sections 1707 and 1708. The code generators generate different PN codes and orthogonal codes. PN codes require correlation time long enough to reduce correlation among codes. FIG. 2A shows a constellation of the modulated signal.

The transmission signals are quadrature-modulated by radio transmission sections 1707 and 1708, then up-converted to carrier frequency fc and input from antenna connection terminals 1709 and 1710 to adder 1711, added up and output by adder 1711. fc is a reception carrier frequency of the present system. The signal output with carrier frequency fc is transmitted from attenuator 1712 to reception terminals 1715 and 1716 of radio reception sections 1713 and 1714. At this time, suppose the cables are equal in length with sufficient accuracy relative to the wavelength of the carrier frequency and the delays by the adder and attenuator have already been measured.

The reception outputs of the radio reception sections are input to complex correlators 1717 and 1718. Complex correlators 1717 and 1718 perform correlation detection at timings adjusted by delay circuit 1719 and output correlation values.

During reception calibration, in order to correct phase shifts during reception operation, it is necessary for timing adjustment circuit 1719 to send a single calibration signal and for each radio reception section to receive this calibration signal and perform calibration. Therefore, during reception calibration, timing adjustment circuit 1719 inputs a switching signal to perform reception calibration and outputs the single calibration signal to all the complex correlators.

Here, timing adjustment circuit 1719 selects either calibration signal 1701 or calibration signal 1702 and outputs the selected calibration signal to complex correlators 1717 and 1718.

Detection circuit 1720 obtains (amplitude ratio, phase difference)=(Ar1, $\Delta\phi r1$) by comparing reception signal point r1 obtained from the correlation value and an identification point to be a reference. The phase difference obtained here corresponds to the delay of the remainder obtained by dividing total delay D of delay Dt of radio transmission sections 1701 and 1708, cable delay Dk and delay Dr1 of radio reception sections 1713 and 1714 (D=Dt+Dk+Dr1) by wavelength $\lambda c$ of carrier frequency fc.

Likewise, (amplitude ratio, phase difference)=(Ar2, $\Delta\phi r2$) 118 is obtained by comparing reception point r2 obtained from the correlation value and a reference identification point.

On the other hand, during transmission calibration, in order to correct phase shifts during transmission operation, it is necessary for each radio reception section to receive a calibration signal sent from each transmission section and perform calibration.

Thus, during transmission calibration, timing adjustment circuit 1719 outputs all calibration signals generated by the code generators to their respective complex correlators. Here, timing adjustment circuit 1719 outputs calibration signals 1701 and 1702 to their corresponding complex correlators 1717 and 1718.

At this time, since PN codes or orthogonal codes, which vary for every radio transmission section, are used as calibration signals, delays for every radio transmission section are obtained from the correlation values output from correlators 1717 and 1718.

Detection circuit 1720 obtains (amplitude ratio, phase difference)=(Ar1, $\Delta\phi r1$) by comparing reception signal point (hereinafter referred to as "reception point") r1 obtained from the correlation value with an identification point to be a reference (hereinafter referred to as "reference identification point"). The phase difference obtained here corresponds to the delay of the remainder obtained by dividing total delay D of delay Dt of radio transmission sections 1707 and 1708, delay Da of adder 1711, cable delay Dk (including a delay in the attenuator) and delay Dr1 of radio reception sections 1713 and 1714 (D=Dt+Da+Dk+Dr1) by wavelength λc of carrier frequency fc.

Likewise, (amplitude ratio, phase difference)=(Ar2, Δϕr2) is obtained by comparing reception point r2 obtained from the correlation value and a reference identification point.

As shown above, the calibration apparatus according to Embodiment 14 of the present invention can perform reception calibration and transmission calibration using a single circuit.

Embodiment 14 explained the case of combining the calibration apparatus according to Embodiment 1 and the calibration apparatus according to Embodiment 9. However, the present invention is not limited to this, it is also possible to combine one calibration apparatus according to Embodiments 1 to 8 with another calibration apparatus according to Embodiments 9 to 13 as appropriate.

The foregoing explanations have given examples of applying the calibration apparatus of the present invention to a radio communication apparatus, but the present invention is not limited to this; the present invention is also applicable to calibration required in the stage of manufacturing an adaptive array antenna system at a factory, etc.

Furthermore, the calibration apparatus according to the embodiments above can be incorporated in a base station apparatus and communication terminal apparatus in a TDMA-based communication.

This application is based on the Japanese Patent Application No.HEI 10-171014 filed on Jun. 18, 1998, entire content of which is expressly incorporated by reference herein.

INDUSTRIAL APPLICABILITY

The present invention is suitable for applications in a TDMA-based digital radio communication field.

What is claimed is:

1. A calibration apparatus comprising:
    a calibration signal transmitter that transmits a calibration signal at a reception carrier frequency in a band equal to or close to a radio communication band;
    an adjuster that changes a signal level of the calibration signal output from said calibration signal transmitter;
    a transmitter that transmits the calibration signal, after the adjuster changes said signal level, to a plurality of radio receivers provided for an array antenna; and
    a detector that detects at least one of a delay characteristic and an amplitude characteristic of said radio receivers using a received calibration signal output from said radio receivers at a plurality of signal levels of the calibration signal, wherein:
        said detector further comprises an interpolator that performs interpolation processing based on a plurality of measuring points corresponding to said plurality of signal levels.

2. The calibration apparatus according to claim 1, wherein said calibration signal transmitter comprises:
    a code generator that generates the calibration signal;
    a modulator that generates a modulated calibration signal by modulating the calibration signal; and
    wherein said transmitter transmits the modulated calibration signal by radio.

3. The calibration apparatus according to claim 1, further comprising a switch that inputs one of a reception signal from said array antenna and the received calibration signal to said radio receivers, corresponding to a control signal.

4. The calibration apparatus according to claim 1, further comprising a multiplexer that multiplexes a reception signal from said array antenna with the received calibration signal and inputs the multiplexed signal to said radio receivers.

5. The calibration apparatus according to claim 1, further comprising a selector that selects a signal to be detected by said detector from signals output by said plurality of radio receivers.

6. The calibration apparatus according to claim 2, further comprising:
    a correlator that detects correlation between the received calibration signal and a transmission calibration signal; and
    a timing adjuster that generates a timing signal from said modulated calibration signal and outputs the timing signal to said correlator, wherein:
        said correlator detects correlation between the received calibration signal and the transmission calibration signal based on the timing signal.

7. The calibration apparatus according to claim 2, further comprising:
    a correlator that detects correlation between the received calibration signal and a transmission calibration signal;
    a transmission timing controller that generates a transmission timing signal that controls a transmission timing of the modulated calibration signal; and
    a correlation detection timing signal generator that generates a correlation detection timing signal from the transmission timing signal, wherein:
        said correlator detects correlation of the received calibration signal based on the correlation detection timing signal.

8. The calibration apparatus according to claim 1, further comprising a signal generator that generates a local signal, wherein said signal generator gives the local signal to said calibration signal transmitter and said plurality of radio receivers.

9. The calibration apparatus according to claim 6, wherein said detector stores or outputs correlation values of said plurality of radio receivers output by said correlator.

10. The calibration apparatus according to claim 6, wherein said detector detects at least one of a phase difference and an amplitude ratio from a reference identification point based on the detected correlation.

11. A calibration apparatus comprising:
    a plurality of calibration signal generators that input calibration signals in a band equal to or close to a radio communication band to a plurality of radio transmitters provided for an array antenna;
    an adjuster that changes the signal levels of the calibration signals output from said radio transmitters;
    a transmitter that transmits the calibration signals, after the adjuster changes the signal levels, to a radio receiver; and
    a detector that detects at least one of a delay characteristic and an amplitude characteristic of said radio transmitters using a received calibration signal output from said radio receiver at a plurality of signal levels of the calibration signals, wherein:
        said detector further comprises an interpolator that performs interpolation processing based on a plurality of measuring points corresponding to said plurality of signal levels.

12. The calibration apparatus according to claim 11, wherein said calibration signal generators comprise:
   a code generator that generates a calibration signal; and
   a modulator that generates a modulated calibration signal by modulating the calibration signal.

13. The calibration apparatus according to claim 11, further comprising:
   a combiner that multiplexes the outputs of said plurality of radio transmitters; and
   a correlator that detects correlation between the received calibration signal and the calibration signals based on a transmission timing of each of said radio transmitters, wherein:
      said detector detects at least one of the delay characteristic and the amplitude characteristic of said radio transmitters based on an output signal of said correlator.

14. The calibration apparatus according to claim 11, further comprising a switch that inputs one of a reception signal from said array antenna and the received calibration signal to said radio receiver, corresponding to a control signal.

15. The calibration apparatus according to claim 11, further comprising a multiplexer that multiplexes a reception signal from said array antenna with said received calibration signal and inputs the multiplexed signal to said radio receiver.

16. The calibration apparatus according to claim 13, further comprising a transmission timing switch that selects a single transmission timing from transmission timings of said radio transmitters and outputs the single transmission timing to said correlator.

17. The calibration apparatus according to claim 11, further comprising a signal generator that generates a local signal, wherein said signal generator gives the local signal to said plurality of radio transmitters and said radio receiver.

18. The calibration apparatus according to claim 13, wherein said detector stores or outputs correlation values of said radio transmitters output by said correlator.

19. The calibration apparatus according to claim 13, wherein said detector detects at least one of the phase difference and the amplitude ratio from a reference identification point based on the detected correlation.

20. A calibration method comprising the steps of:
   (a) generating a calibration signal in a band equal to or close to a radio communication band;
   (b) changing a signal level of the calibration signal to a plurality of signal levels;
   (c) transmitting the calibration signal, after said changing of the signal level, to a radio receiver;
   (d) detecting at least one of a delay characteristic and an amplitude characteristic of said radio receiver at said plurality of signal levels of the calibration signal; and
   (e) performing interpolation processing based on a plurality of measuring points corresponding to said plurality of signal levels.

21. A calibration method comprising the steps of:
   (a) generating a calibration signal in a band equal to or close to a radio communication band;
   (b) changing a signal level of the calibration signal to a plurality of signal levels;
   (c) transmitting the calibration signal, after said changing of the signal level, from a radio transmitter to a radio receiver; and
   (d) detecting at least one of a delay characteristic and an amplitude characteristic of said radio transmitter at said plurality of signal levels of the calibration signal; and
   (e) performing, when the calibration signal is changed to said plurality of signal levels, interpolation processing based on a plurality of measuring points corresponding to said plurality of signal levels.

* * * * *